(12) United States Patent
Mitten et al.

(10) Patent No.: US 7,111,092 B1
(45) Date of Patent: Sep. 19, 2006

(54) BUFFER MANAGEMENT TECHNIQUE FOR A HYPERTRANSPORT DATA PATH PROTOCOL

(75) Inventors: John W. Mitten, Cary, NC (US); Christopher G. Riedle, Cary, NC (US); David Richard Barach, Boxborough, MA (US); Kenneth H. Potter, Jr., Raleigh, NC (US); Kent Hoult, Lexington, MA (US); Jeffery B. Scott, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 10/826,076

(22) Filed: Apr. 16, 2004

(51) Int. Cl.
*G06F 13/00* (2006.01)

(52) U.S. Cl. .............. 710/52; 710/33; 710/22; 710/6; 710/310; 370/412; 370/429

(58) Field of Classification Search ............... 710/5–6, 710/20–29, 33–35, 52–57, 308–310; 370/392, 370/389, 412, 429; 711/118, 114, 156
See application file for complete search history.

(56) References Cited

U.S. PATENT DOCUMENTS

| | | | | |
|---|---|---|---|---|
| 5,438,872 A | * | 8/1995 | Kobayashi et al. | 73/597 |
| 5,737,520 A | * | 4/1998 | Gronlund et al. | 714/39 |
| 6,334,162 B1 | * | 12/2001 | Garrett et al. | 710/54 |
| 6,401,147 B1 | * | 6/2002 | Sang et al. | 710/56 |
| 6,708,768 B1 | | 3/2004 | Potter et al. | |
| 6,735,210 B1 | * | 5/2004 | Lindeborg et al. | 370/412 |
| 6,757,768 B1 | * | 6/2004 | Potter et al. | 710/112 |
| 6,832,279 B1 | | 12/2004 | Potter et al. | |
| 6,934,776 B1 | * | 8/2005 | Connor et al. | 710/60 |
| 7,065,582 B1 | * | 6/2006 | Dwork et al. | 709/234 |
| 2001/0007565 A1 | * | 7/2001 | Weng et al. | 370/429 |
| 2002/0176430 A1 | * | 11/2002 | Sangha et al. | 370/412 |
| 2004/0210794 A1 | * | 10/2004 | Frey et al. | 714/5 |
| 2005/0213570 A1 | * | 9/2005 | Stacy et al. | 370/389 |

OTHER PUBLICATIONS

U.S. Appl. No. 10/818,670, filed Apr. 6, 2004, entitled Hypertransport Data Path Protocol, by Mitten et al.
HyperTransport Technology Consortium, HyperTransport I/O Link Specification, Rev. 1.10, Aug. 25, 2003.

\* cited by examiner

*Primary Examiner*—Christopher Shin
(74) *Attorney, Agent, or Firm*—Cesari and McKenna LLP

(57) ABSTRACT

A buffer-management technique efficiently manages a set of data buffers accessible to first and second devices interconnected by a split transaction bus, such as a Hyper-Transport (HPT) bus. To that end, a buffer manager controls access to a set of "free" buffer descriptors, each free buffer descriptor referencing a corresponding buffer in the set of data buffers. Advantageously, the buffer manager ensures that the first and second devices are allocated a sufficient number of free buffer descriptors for use in a HPT data path protocol in which the first and second devices have access to respective sets of free buffer descriptors. Because buffer management over the HPT bus is optimized by the buffer manager, the amount of processing bandwidth traditionally consumed managing descriptors can be reduced.

24 Claims, 15 Drawing Sheets

BUFFER MANAGEMENT TECHNIQUE FOR A HYPERTRANSPORT DATA PATH PROTOCOL

RELATED APPLICATIONS

This application is related to U.S. patent application Ser. No. 10/818,670 entitled HYPERTRANSPORT DATA PATH PROTOCOL, by John Mitten, et al., the teachings of which are expressly incorporated herein by reference.

FIELD OF THE INVENTION

This invention relates generally to communication protocols, and, more specifically, to a data path protocol for transferring data over a split transaction bus, such as a HyperTransport bus.

BACKGROUND OF THE INVENTION

A computer network is a geographically distributed collection of interconnected subnetworks for transporting data between nodes, such as computers. A local area network (LAN) is an example of such a subnetwork; a plurality of LANs may be further interconnected by an intermediate network node, such as a router or switch, to extend the effective "size" of the computer network and increase the number of communicating nodes. The nodes typically communicate by exchanging discrete frames or packets of data according to predefined network communication protocols. In this context, a network communication protocol consists of a set of rules defining how the nodes interact with each other.

Each node typically comprises a number of basic systems including a processor, a main memory and an input/output (I/O) system. Data is transferred between the main memory, processor and I/O system over a system bus, while data transactions within the I/O system occur over an external bus, such as an I/O bus. Each bus typically consists of either address, data and control lines, with the control lines carrying control signals specifying the direction and type of transfer, or a pair of unidirectional communication lines for passing I/O packets containing address, data and control information, such as in the case of a HyperTransport bus. For example, the processor (i.e., a source) may issue a read transaction to request the transfer of data from an addressed location on an I/O device (i.e., a target) which is coupled to the I/O bus over the system bus. The processor then processes the retrieved data in accordance with instructions that may have been obtained from main memory. The processor may thereafter issue a write transaction requesting that the results be stored in, e.g., another addressed location in the I/O device.

Some buses operate in an "atomic" manner such that the source device is granted exclusive access (i.e., control) to the bus until the data transfer is complete. However, an atomic bus may potentially waste bus cycles, particularly when waiting for data in response to, e.g., a read request. In a split transaction bus, on the other hand, the source relinquishes control over the bus once the request is sent to the target device. After processing the request, the target may independently acquire control of the bus and return a response to the source. The split transaction bus thus essentially enables each transaction over the split transaction bus to be divided into at least two separate communications: the request and the response. For example, a read transaction over the bus may comprise a read request and a separate read response.

The split transaction bus may be configured to perform both "posted" and "non-posted" transactions. A posted transaction corresponds to a request that does not solicit a response over the bus; a non-posted transaction corresponds to a request for which a response is required.

In general, each request and response transmitted over the split transaction bus is formatted in accordance with the bus's protocol. The bus protocol defines a set of rules for transmitting data packets between source and target devices interconnected by the split transaction bus. For example, the bus protocol may specify, among other things, formatting and configuration information associated with the bus. An illustrative split transaction bus protocol is the conventional HyperTransport (HPT) bus protocol, which is set forth in *HyperTransport I/O Link Specification, Revision* 1.10, published August 2003, and is hereby incorporated by reference.

The HPT bus protocol is often used to manage communications over a HPT bus that couples a system controller (i.e., a source device) and a forwarding engine (i.e., a target device) in an intermediate network node. By way of example, assume data is transferred between a direct memory access (DMA) engine in the source device and a central processing unit (CPU) in the target device. In this scenario, network packet data may be received by the DMA engine and forwarded over the HPT bus to the CPU. The CPU makes a forwarding determination for the received packet, modifies the packet data if necessary, then returns the processed packet data back across the bus to the DMA engine.

Traditionally, the CPU in the target device manages a "pool" of data buffers, where each buffer is typically a fixed-sized memory block. In practice, each data buffer is associated with a corresponding buffer descriptor. The buffer descriptor essentially "describes" the location and contents of its corresponding data buffer. For example, the descriptor may include, inter alia, the memory address of the buffer, the amount of data stored in the buffer, various flag values associated with the buffer, and so forth. As used herein, a "free" buffer descriptor references a data buffer that is currently not in use and is therefore available to store data.

A data path protocol is usually employed when data is transferred between the source and target devices. Conventional data path protocols define a sequence of read and write transactions that collectively define a procedure for transferring the data over, e.g., the HPT bus. In accordance with these protocols, the target device is responsible for issuing buffer descriptors to the source device whenever data is transferred across the bus. Thus, when the source device desires to transfer data to the target device, the target device issues the source device a free buffer descriptor corresponding to a data buffer available to store the transferred data. After processing the transferred data, the target device then issues another buffer descriptor to the source device indicating which buffer(s) stores the processed data. The target device is also responsible for "recycling" (i.e., reusing) descriptors whose referenced buffers are no longer in use.

A conventional HPT data path protocol defines a first sequence of read and write transactions for the source device to transfer the data to the target device and a second sequence of read and write transactions to return the processed data back to the source device. For purposes of discussion, assume the conventional data path protocol is employed for transferring data between a source device DMA engine and a target device CPU in an intermediate network node.

Previously, the following steps are performed for transferring data from the DMA engine to the CPU, i.e., in the "To-CPU" direction. First, the DMA engine initiates a read transaction across the HPT bus to retrieve one or more free buffer descriptors corresponding to data buffers available to store data in the target device. The CPU maintains a list (or queue) of free buffer descriptors. The CPU initializes descriptors in this list to indicate that they are available for the DMA engine to access. To that end, the CPU may set "ownership" flag values in the descriptors to indicate that they are available to the DMA engine. Accordingly, in response to receiving the DMA engine's read request, the CPU acquires the requested free buffer descriptor(s) whose ownership flag values indicate that they are accessible to the DMA engine. The CPU then returns the requested descriptor (s) to the DMA engine. Having received the requested descriptors, the DMA engine writes the data into the target-device data buffers referenced by the received descriptors. Then, the DMA engine updates the contents of the descriptors to coincide with the transferred data, if necessary. The DMA engine performs a write transaction over the HPT bus to return the updated descriptors back to the CPU.

After processing the transferred data, another set of read and write transactions is performed in the "From-CPU" direction. Specifically, the CPU maintains a list (or queue) of descriptors whose referenced data buffers contain processed data that may be returned to the DMA engine. The CPU sets the ownership flag values in these descriptors to indicate that they are accessible to the DMA engine. The DMA engine initiates the From-CPU data transfer by performing a read transaction across the HPT bus to retrieve one or more buffer descriptors from the head of this list. In response, the CPU forwards the requested descriptors to the DMA engine which then retrieves the processed data from the descriptors' referenced data buffers. Alternatively, the DMA engine may retrieve the data by writing a control instruction to a data mover, e.g., tightly coupled to the CPU, that effectuates the data transfer to the source device. That is, in accordance with the control instruction, the CPU's data mover transfers the data referenced by the DMA's requested descriptor(s). In either case, the DMA engine updates the contents of the buffer descriptors, if necessary, and performs a write transaction over the HPT bus to return the updated descriptors to the CPU. For instance, the DMA engine may toggle the descriptors' ownership flag values to indicate that they are now available for use by the CPU. The target device then may reuse these descriptors as free buffer descriptors in a subsequent data transfer.

The conventional data path protocol described above suffers the disadvantage of having to perform read and write transactions in both the To-CPU and From-CPU directions. Specifically, before each data transfer over the HPT bus, the source device must perform a read transaction to obtain a buffer descriptor from the target device. The source device must subsequently perform a write transaction to return the descriptor to the target device. As such, this process of exchanging buffer descriptors between the source and target devices may consume an excessive amount of the HPT bus's available bandwidth.

In addition, the conventional HPT data path protocol is limited by the inherent latencies of performing read transactions. For instance, when the target device receives a read request from the source device, the target device retrieves the requested buffer descriptor(s) and returns the requested descriptor(s) to the source device. This read transaction may consume an unreasonable amount of processing bandwidth within the target device. Moreover, because the data transfer can not be performed over the HPT bus until the read transaction is completed, i.e., the requested buffer descriptor (s) is forwarded to the source device, the latency of performing the read transaction is often a substantial portion of the overall latency of the data transfer. That is, in both the To-CPU and From-CPU directions, a substantial portion of the time consumed transferring data between the source and target devices is the time required to complete the read transaction.

There is therefore a need in the art for a data path protocol that consumes less bandwidth over a split transaction bus and reduces the latency required to transfer data between source and target devices connected to the bus. The protocol should not only consume less bandwidth over the split transaction bus, but also improve the processing bandwidth within individual devices coupled to the bus.

SUMMARY OF THE INVENTION

The present invention provides a technique for efficiently managing a set of data buffers accessible to first and second devices interconnected by a split transaction bus, such as a HyperTransport (HPT) bus. To that end, a buffer manager controls access to a set of "free" buffer descriptors, each free buffer descriptor referencing a corresponding buffer in the set of data buffers. Advantageously, the buffer manager ensures that the first and second devices are allocated a sufficient number of free buffer descriptors for use in a HPT data path protocol in which the first and second devices have access to respective sets of free buffer descriptors. Because buffer management over the HPT bus is optimized by the buffer manager, the amount of processing bandwidth traditionally consumed managing descriptors can be reduced.

In accordance with an illustrative embodiment, the buffer manager includes at least one free-buffer controller and a "pool" of free buffer descriptors, e.g., stored in a buffer cache. Illustratively, the buffer manager, the free-buffer controller and the pool of free buffer descriptors are located in the first device. The free-buffer controller manages access to the pool of free buffer descriptors. For instance, the controller ensures that the pool has a sufficient number of descriptors and therefore may generate an error message if the pool becomes, e.g., empty or full. To control the number of descriptors in the descriptor pool, the controller may "extend" the pool from an internal memory in the first device to an external memory, e.g., stored in the first or second device. The free-buffer controller may control the movement of descriptors between the first device's internal and external memories in a manner that is transparent to the second device.

The free-buffer controller may add or remove descriptors from the pool of free buffer descriptors. For instance, a central processing unit (CPU) in the second device may transfer one or more of the second device's free buffer descriptors to a predetermined "From-CPU" first-in, first out (FIFO) descriptor queue in the first device. Upon identifying the transferred free buffer descriptors, the free-buffer controller may transfer the descriptors from the From-CPU descriptor FIFO to the pool of free buffer descriptors stored in the first device. Similarly, the controller may transfer descriptors out of the pool to a predetermined "To-CPU" free-buffer FIFO in the second device. In this case, the CPU in the second device may be configured to acquire free buffer descriptors from this To-CPU free-buffer FIFO. The free-buffer controller also may return "non-recycled" buffer descriptors to the second device. That is, if the controller recognizes that a descriptor enqueued in a From-CPU descriptor FIFO in the first device references buffer data that should not be overwritten, e.g., as requested by the CPU, the descriptor is not added to the pool of free buffer descriptors; instead, the descriptor is returned to the second device so its referenced data may be reused.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

A. NETWORK ENVIRONMENT

Figure 1:
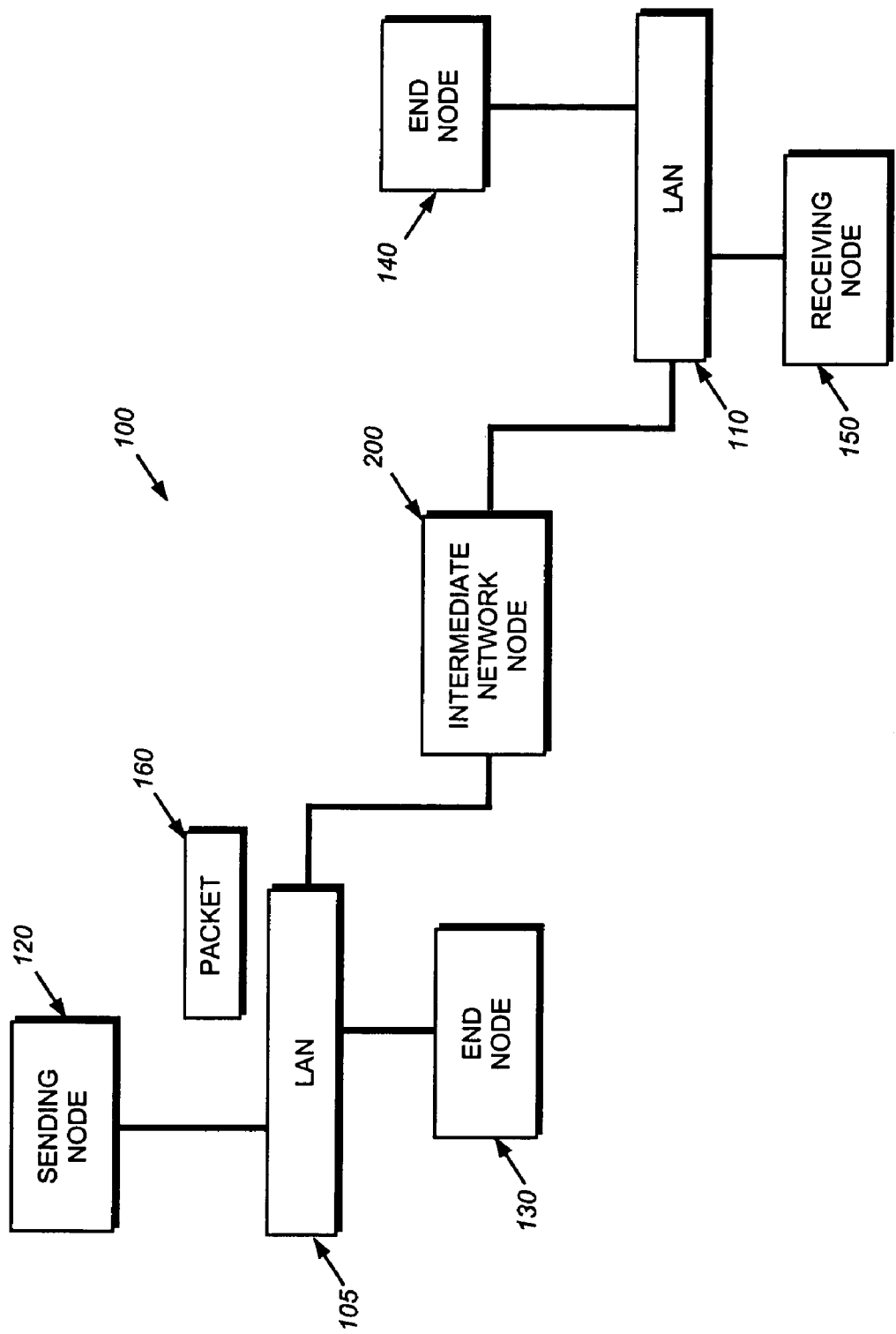
FIG. 1 is a schematic block diagram of a computer network comprising a collection of interconnected subnetworks and nodes, including an intermediate network node.

FIG. 1 is a schematic block diagram of a computer network 100 comprising a collection of interconnected subnetworks and nodes. The nodes may comprise computers including end nodes 130 and 140, such as a sending end node 120 and a receiving end node 150, and an intermediate network node 200, the latter of which may be a switch or router. The subnetworks 105, 110 included within network 100 are preferably local area networks (LANs) interconnected by the intermediate node 200, although the networks may comprise other communication links, such as wide area networks. Communication among the nodes coupled to the LANs is typically effected by exchanging discrete packets 160 among the nodes.

For example, the sending node 120 generates a data packet 160 by encapsulating "payload" data within headers, such as conventional data link and internetwork headers, as the data passes through different layers of a protocol stack. The packet is then transmitted over the network to the intermediate node 200 which facilitates the flow of the data packet through the network by routing it to the proper receiving node 150. Specifically, the node 200 receives the packet at one of its network interfaces and renders a forwarding decision for the packet based on a destination end node specified by the packet's internetwork header. The packet's data link header is modified in accordance with the forwarding decision and the packet is transmitted over an appropriate subnetwork coupled to the intermediate network node.

Figure 2:
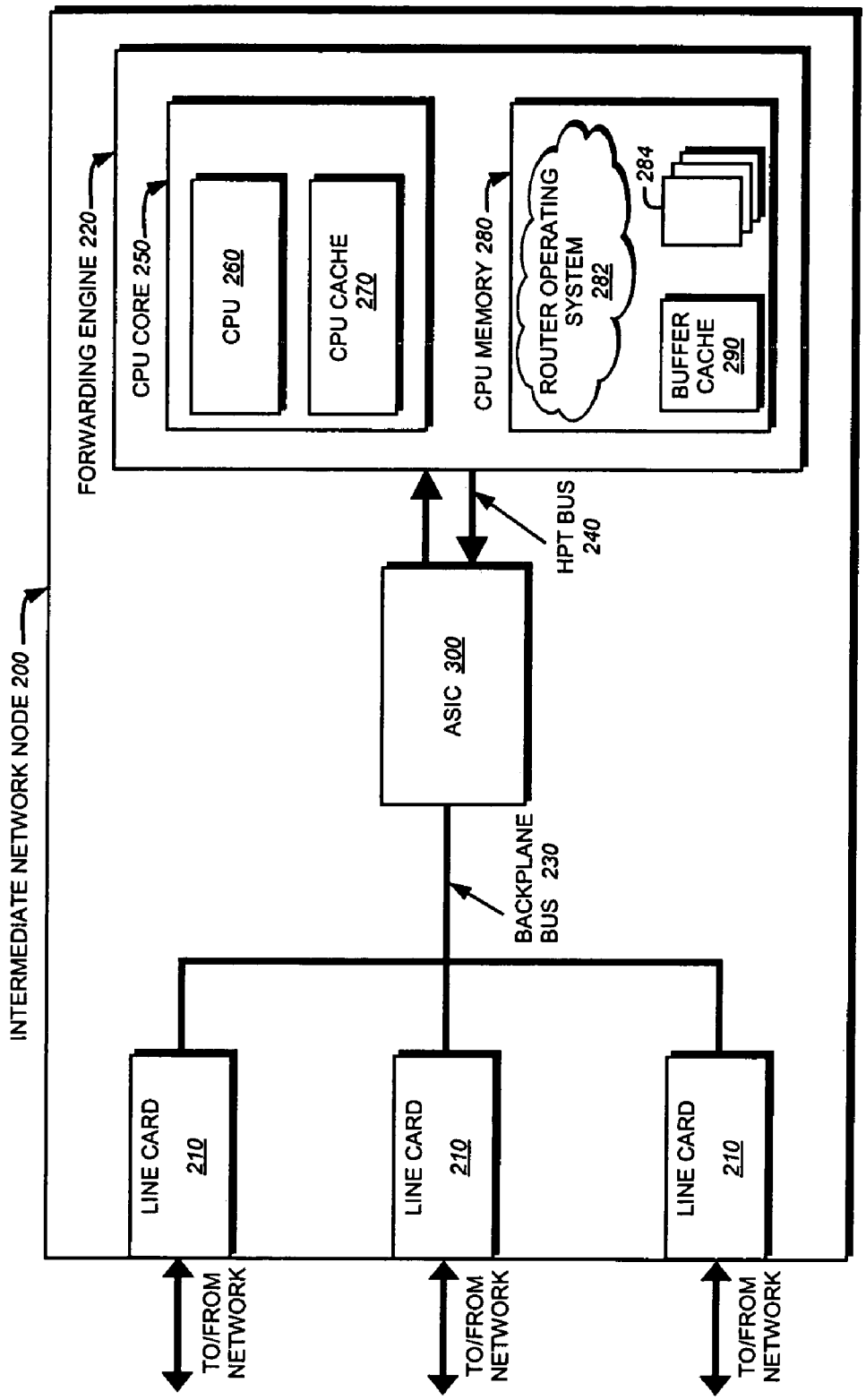
FIG. 2 is a schematic block diagram of an illustrative intermediate network node that may be used in accordance with the present invention.

FIG. 2 is a schematic block diagram of an intermediate node 200 that may be advantageously used with the present invention. The node comprises a plurality of line cards 210, an application specific integrated circuit (ASIC) 300 and a forwarding engine 220. Data is received at the line cards 210, each of which is coupled to at least one network or subnetwork, such as the LANs 105 and 110. The line cards contain the mechanical, electrical and signaling circuitry that enables the intermediate network node 200 to communicate over physical links connected to networks and subnetworks, including, inter alia, asynchronous transfer mode (ATM) networks, synchronous optical networks (SONET), wireless networks, frame relay networks, Ethernet networks, Fiber Distributed Data Interface (FDDI) networks, etc.

The ASIC 300 is coupled to each line card 210 by a backplane bus 230 and is further coupled to the forwarding engine 220 by a pair of high-speed HyperTransport (HPT) links which functions as a bi-directional HPT bus 240. The ASIC 300 therefore may function as a "bridge" for transferring data between the backplane and HPT buses. The ASIC also may include circuitry or logic for processing the data while it is transferred from one bus to another. For instance, the ASIC can receive data from the backplane bus 230 and convert the data to a format that may be transmitted over the HPT bus 240. Illustratively, the ASIC 300 may be embodied in other forms of hardware, such as a field-programmable gate array (FPGA), and alternatively may be implemented in various combinations of hardware and/or software.

The forwarding engine 220 comprises a central processing unit (CPU) "core" 250 and a CPU memory 280. The CPU core contains at least one CPU 260 and a local memory cache 270. The CPU may be implemented as a general-purpose processor, a special-purpose processor, or the like. The CPU memory 280 is addressable by the CPU 260 and also may be addressable by devices coupled to the memory over the HPT bus 240. The memory 280 preferably comprises a form of random access memory (RAM) that is generally cleared by a power cycle or other reboot operation (e.g., it is a "volatile" memory). For instance, the memory 280 may comprise dynamic random access memory (DRAM) and/or synchronous DRAM (SDRAM) storage locations adapted to store program code and data structures accessible to the CPU 260. It will be apparent to those skilled in the art that the memory 280 may also comprise other memory means, including various computer-readable media, for storing program instructions and data structures pertaining to the operation of the intermediate network node 200.

A router operating system 282, portions of which are typically resident in the memory 280 and executed by the CPU 260, functionally organizes the intermediate network node 200 by, inter alia, invoking network operations in support of software processes executing on the intermediate node. The IOS™ operating system by Cisco Systems, Inc. is one example of a router operating system 282. The operating system may perform routing operations on data packets 160 received by the line cards 210. Accordingly, a portion of the CPU memory 280 may be organized as a buffer cache 290 containing a "pool" of buffers configured to store received packet data. Operationally, a received packet 160 is transferred from a line card 210, through the ASIC 300, to one or more data buffers stored in the buffer cache 290. Preferably, each data buffer stores a fixed amount, e.g., 512, 1024 or 2048 bytes, of packet data. Data structures 284 resident in the memory 280 may be configured to store memory references (e.g., "descriptors") and other information related to the buffers in which the packet data is stored. The router operating system 282 may rely on the contents of the buffers and their associated data structures to render a forwarding decision for the received data packet.

Figure 3:
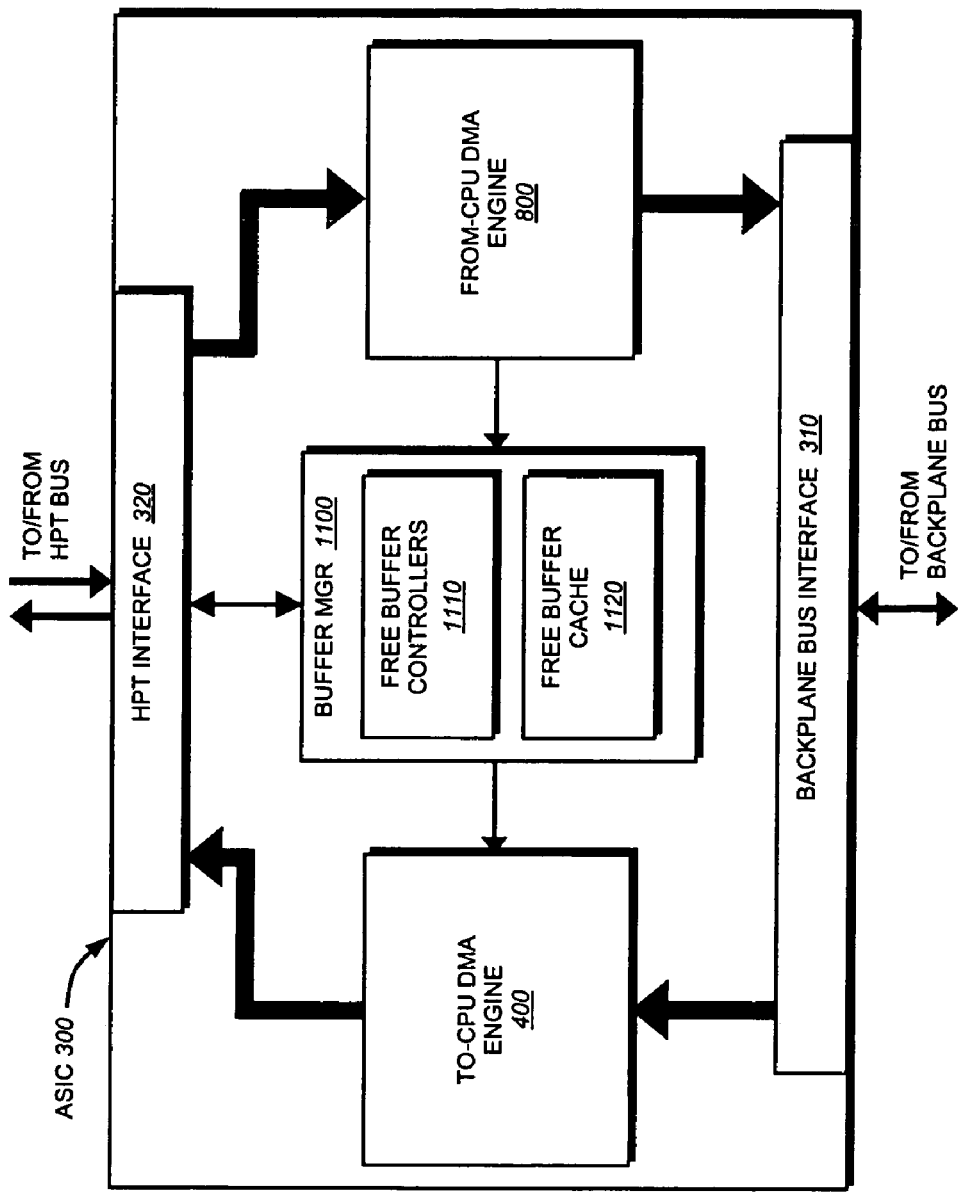
FIG. 3 is a schematic block diagram of an exemplary application specific integrated circuit that may be implemented in an intermediate network node.

FIG. 3 is a schematic block diagram of the ASIC 300 comprising a backplane bus interface 310, a HPT interface 320, a To-CPU direct memory access (DMA) engine 400, a From-CPU DMA engine 800 and a buffer manager 1100. The backplane bus interface contains circuitry and logic adapted to send and receive data over the backplane bus 230. As shown by the ASIC's internal data path (in bold), the data received by the interface 310 is forwarded to the To-CPU DMA engine 400 which is responsible for sending the data to the forwarding engine 220. More specifically, the To-CPU DMA engine locates buffers in the buffer cache 290 in which the data may be stored. To that end, the buffer manager 1100 may supply the To-CPU DMA engine 400 with one or more free buffer descriptors corresponding to available buffers in the buffer cache.

The data is then transferred from the To-CPU DMA engine 400 to the HPT interface 320, which contains circuitry and logic for formatting and transmitting the data over the HPT bus 240. Access to the HPT interface 320 may be controlled by arbitration logic and/or circuitry (i.e., an "arbiter"), e.g., tightly coupled to or directly incorporated with the HPT interface. The arbiter may employ, for example, a weighted round-robin arbitration scheme for scheduling access to the HPT bus 240 among the To-CPU DMA engine 400, From-CPU DMA engine 800 and buffer manager 1100. The HPT interface 320 forwards the data to the appropriate data buffers in the CPU memory 280.

After the data has been processed by the CPU 260, the From-CPU DMA engine 800 can retrieve the processed data from the buffer cache 290. Namely, the data is transferred from the CPU memory 280 over the HPT bus 240 to the HPT interface 320 which, in turn, forwards the data to the From-CPU DMA engine. The From-CPU DMA engine returns the buffer descriptors corresponding to the transferred data to the buffer manager 1100. A free buffer controller 1110 in the buffer manager may determine which (if any) of the returned descriptors may be "reused" and which may not, and then processes the returned descriptors accordingly. The From-CPU DMA engine 800 forwards the processed data to the backplane bus interface 310. The data is then returned to addressed devices, e.g., line cards 210, coupled to the backplane bus 230.

The buffer manager 1100 includes one or more free buffer controllers 1110 and a free buffer cache 1120. The free buffer cache is an internal memory, such as a static RAM (SRAM) memory element, that is configured to store a predetermined number of free buffer descriptors, e.g., 1024 descriptors. Those skilled in the art will appreciate that the free buffer cache may be implemented using various computer-readable media known in the art. The free buffer controllers 1110 manage access to the descriptors stored in the free buffer cache 1120 and also may manage access to an external buffer cache in the CPU memory 280. For instance, the controllers can allocate free buffer descriptors to the To-CPU DMA engine 400 and "recycle" (i.e., return to the free buffer cache 1120 and/or the external buffer cache) at least some descriptors received from the From-CPU DMA engine 800.

B. TO-CPU DATA TRANSFER

Figure 4:
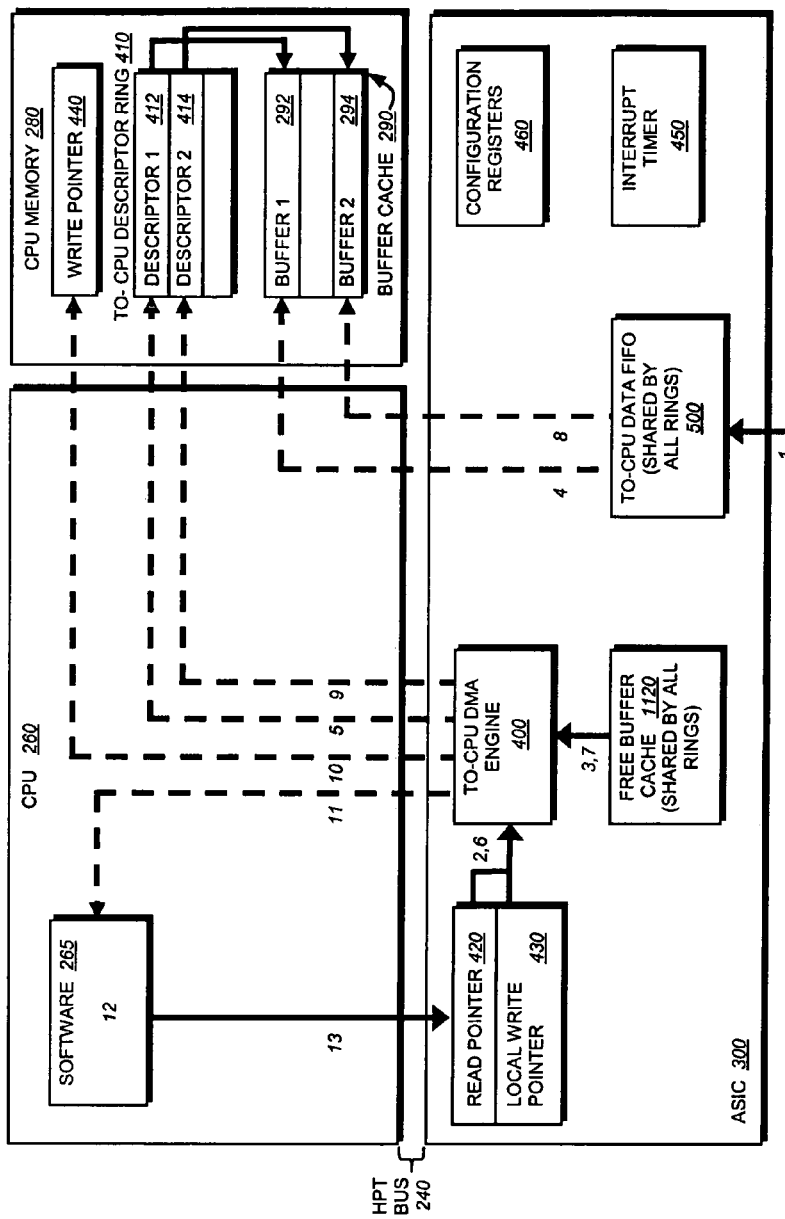
FIG. 4 is a schematic block diagram of an exemplary To-CPU data transfer that may be performed in accordance with the present invention.

FIG. 4 illustrates a schematic block diagram including a sequence of steps that may be employed by the novel HPT data path protocol of the present invention for transferring data between the ASIC 300 and the forwarding engine 220, i.e., in the To-CPU direction. For purposes of explanation, each depicted step of the To-CPU data transfer process is accorded a respective step number. At Step 1, the ASIC 300 receives packet data, e.g., from the backplane bus 230, and stores the data in an appropriate entry of a To-CPU data FIFO 500. Specifically, a data packet 160 is received at a line card 210, which then reformats the data into typically smaller packets, cells or frames that may be forwarded over the bus 230. The backplane bus interface 310 is configured to receive the data transmitted over the backplane bus and store the received packet data in an appropriate entry of the FIFO 500. Preferably, the packet data is forwarded over the backplane bus "in order" so that the interface 310 does not require specialized reordering logic or circuitry for reassembling the data packet.

After the end of the packet 160 is stored in the To-CPU data FIFO 500 or a predetermined amount of data has been enqueued in the FIFO, the DMA engine 400 transfers the packet data over the HPT bus 240 to one or more buffers stored in the buffer cache 290. Accordingly, the To-CPU data FIFO 500 functions as a data buffer that may separate clock domains between the To-CPU DMA engine 400 and the forwarding engine's CPU 260. Illustratively, the To-CPU DMA engine dequeues data from the FIFO 500 in units equal to the maximum "burst" size, e.g., 64 bytes, specified by a HPT bus protocol associated with the HPT bus 240.

At Step 2, the To-CPU DMA engine 400 determines whether there is an available entry in the target To-CPU descriptor ring 410 stored in the CPU memory 280. That is, before the DMA engine 400 can transfer the received packet data from the To-CPU data FIFO 500 to one or more buffers in the buffer cache 290, the DMA engine first must ensure that the data is addressed to a To-CPU descriptor ring 410 that is not "full," i.e., the ring contains at least one available entry. To determine whether or not the To-CPU descriptor ring is full, the DMA engine 400 may access a read pointer 420 and a local write pointer 430 associated with the descriptor ring 410. The read pointer stores an index value corresponding to the next entry in the descriptor ring that will be processed by the CPU 260. The local write pointer stores an index value corresponding to the next descriptor-ring entry in which a buffer descriptor will be written. Based on the values of the pointers 420 and 430 and knowledge of the descriptor ring length, the DMA engine 400 can calculate how many entries in the ring 410 are available to store new buffer descriptors.

The read and local write pointers 420 and 430 are stored in predetermined memory locations, such as registers, in the ASIC 300. The index stored by the read pointer 420 is written by the CPU 260, and the DMA engine 400 is permitted read-only access to this value. The local write pointer 430 is preferably only accessible to the DMA engine 400. The DMA engine copies the local write pointer associated with the ring 410 to a write pointer 440, e.g., stored at a predetermined location in the CPU memory 280, that is also associated with the descriptor ring 410. The DMA engine updates the local write pointer 430 every time it writes a buffer descriptor to the descriptor ring 410, however, the DMA engine only updates the CPU's write pointer 440 after a set of descriptors corresponding the entire received packet 160 have been written to the descriptor ring 410. Thus, the index stored by the write pointer 440 always corresponds to a descriptor-ring entry that stores a descriptor referencing the end of a data packet.

At Step 3, assuming an available entry is located in the descriptor ring 410, the To-CPU DMA engine 400 determines whether there is an available buffer in the buffer cache 290. To that end, the DMA engine cooperates with a buffer controller 1110 to acquire a free buffer descriptor from the free buffer cache 1120. Specifically, the free buffer cache contains a pool of descriptors that reference memory buffers in the cache 290 that are available ("free") to store new data for the CPU 260 to process. Thus, unlike prior implementations, the DMA engine 400 can obtain a free buffer descriptor within the ASIC 300, as opposed to having to perform a conventional read transaction to request the free buffer descriptor from the CPU. For purposes of discussion, assume the To-CPU DMA engine 400 acquires a free buffer descriptor corresponding to the buffer 292.

At Step 4, the DMA engine 400 forwards the received packet data from the To-CPU data FIFO 500 to the buffer 292, until either the entire packet 160 has been completely transferred (i.e., an EOP flag 524 is detected) or the buffer 292 has been filled. As noted, the DMA engine transfers the packet data over the HPT bus 240 as a series of HPT bus packets, each packet being configured to store the bus's maximum burst size, e.g., 64 bytes. At Step 5, the To-CPU DMA engine updates the contents of the free buffer descriptor obtained at Step 3. In particular, the contents of the descriptor are modified to reflect, e.g., the amount of data that was transferred to the buffer 292, the buffer's memory location, and so forth. At Step 5, the DMA engine writes the updated buffer descriptor 412 to the next available entry in the descriptor ring 410.

The process of receiving packet data, locating an available entry in the descriptor ring 410, obtaining a free buffer descriptor and transferring the received data to a buffer referenced by the obtained descriptor (i.e., Steps 1–4) is repeated until the entire packet 160 has been copied to buffers in the buffer cache 290. Those skilled in the art will appreciate that the above-noted procedure may be repeated for transferring the received packet data into an arbitrary number of buffers in the buffer cache 290. For instance, as shown, the packet 160 is stored in two buffers 292 and 294, respectively referenced by the buffer pointers 412 and 414. Accordingly, Steps 2–5 are performed for transferring the first portion of the received packet to the buffer 292 and the Steps 6–9 are performed in the same manner for transferring the latter portion of the packet to the buffer 294. In this case, the buffer 292 is entirely filled, whereas the buffer 294 may not be.

Once the entire packet 160 is copied into the buffers 292 and 294, and its corresponding buffer descriptors 412 and 414 are enqueued in the To-CPU descriptor ring 410, at Step 10 the To-CPU DMA engine 400 updates the descriptor-ring index stored by the CPU's write pointer 440 to coincide with the index stored by the local write pointer 430. At Step 11, the DMA engine sends an interrupt to the CPU 260 to notify the software 265 running on the CPU that the entire packet 160 has been transferred and is ready to be processed. Illustratively, the software 265 is the router operating system 282 which is configured to make a forwarding decision for the packet 160. However, in general, the software 265 may be any kernel-level or user-level application, operating system, etc. that is executable by the CPU 260.

According to the illustrative embodiment, the To-CPU DMA engine 400 updates the write pointer value 440 and sends the CPU interrupt after a predetermined time interval measured by the interrupt timer 450 has expired. Here, it is noted that when multiple CPUs 260 are coupled to the HPT bus 240, each CPU may be associated with its own descriptor ring 410 and write pointer 440 in the CPU memory 280. In this case, the interrupt sent by the DMA engine 400 (at Step 11) identifies which descriptor ring 410 contains the transferred packet data and thus which write pointer 440 has been updated.

At Step 12, in response to the received interrupt, the software 265 sequentially dequeues the descriptors 412 and 414 from the To-CPU descriptor ring 410 so the CPU 260 can process the packet data stored in the buffers 292 and 294. After each descriptor is dequeued from the descriptor ring 410, the software at Step 13 updates the index stored by the read pointer 420 to correspond to the index of the next entry read from the descriptor ring 410. The software 265 continues to dequeue descriptors from the ring 410, process the dequeued descriptors' referenced data and update the read pointer value 420 until the entire packet 160 has been processed.

Figure 5:
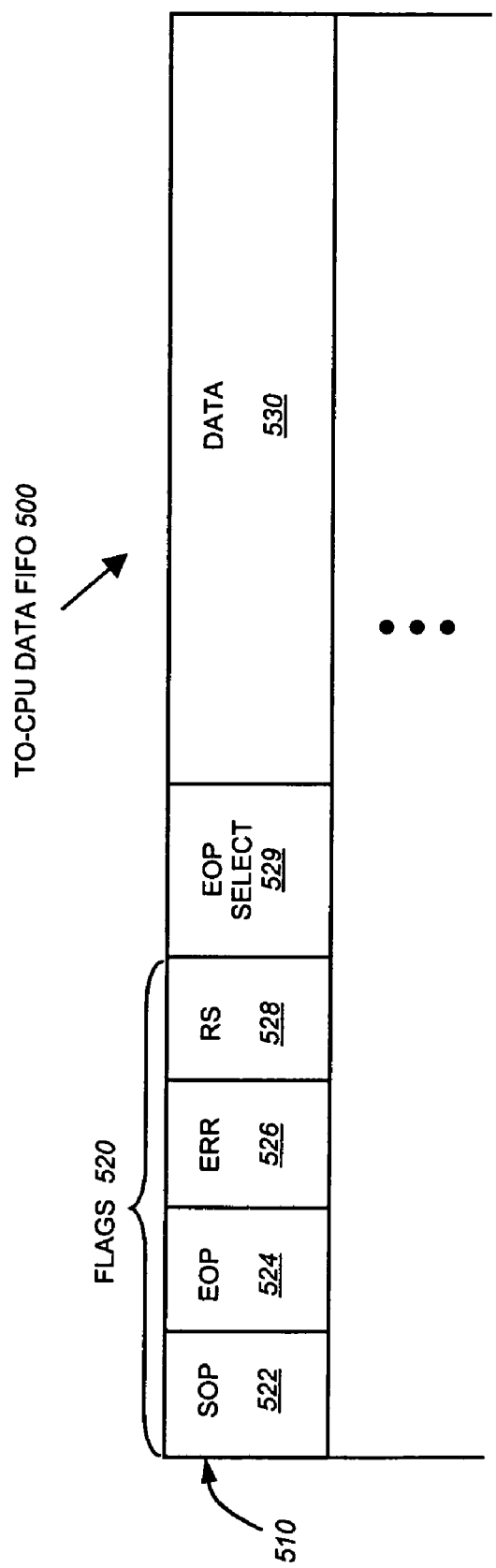
FIG. 5 is a schematic block diagram of an illustrative To-CPU data FIFO that may store data transferred in a To-CPU direction.

FIG. 5 illustrates an exemplary To-CPU data FIFO 500 that may be used in accordance with the illustrative embodiment. The To-CPU data FIFO comprises a plurality of entries 510, each of which includes a set of flag values 520, an end-of-packet (EOP) select field 529 and a data section 530. The flags 520 include, inter alia, a start-of-packet (SOP) flag 522, an EOP flag 524, an error (ERR) flag 526 and a ring-select (RS) flag 528. The SOP flag may be set to a value that indicates that the in-coming data is located at the start of the data packet 160. Similarly, the EOP flag may be set to a value that indicates that the data is located at the end of the packet. The ERR flag may be set when an error is detected in the received packet data, e.g., as a result of a cyclic redundancy check (CRC) or the like. In response to a packet error indication, the EOP flag is preferably set to a value that indicates the end of the packet, thereby truncating the data packet even if all the packet's data has not yet been received.

When the EOP flag 524 and/or the ERR flag 526 indicates that the data section 530 contains the end of the packet, the EOP select field 529 may be used to store a value indicating where the last byte of packet data is located in the data section. As such, the value stored in the EOP select field enables the To-CPU DMA engine 400 to accurately calculate the length of the received packet 160. For instance, suppose the data section 530 is configured to store 8 bytes of data. Under normal circumstances, all eight bytes in the data section store received packet data. However, when the EOP or ERR flag is asserted, the packet data may not span all eight bytes in the data section. In this case, the EOP select field 529 may contain three bits that store a binary indication of which of the 8 bytes contains the last byte of the received data packet.

Here, it is noted that the CPU core 250 may contain multiple CPUs 260 to which received packet data may be addressed. Moreover, each CPU may be associated with one or more To-CPU descriptor rings 410 (i.e., circular, finite-length queues) configured to store buffer descriptors whose corresponding buffers contain data for the CPU to process. For instance, a CPU 260 may prioritize received packet data, e.g., as high priority or low priority, so the data can be processed in an efficient manner. As such, the CPU may maintain separate high and low priority descriptor rings 410 to store descriptors whose referenced buffers respectively store the high and low priority data. In the illustrative embodiment, all in-coming packet data received at the ASIC 300 is stored in the FIFO 500, regardless of which CPU 260 is destined to process the data or which priority level (if any) is associated with the data.

The RS flag 528 may be set to a value that indicates a destination for the received packet data. Unlike the flags 522–526, the RS flag 528 is not restricted to a binary value and may assume more than two possible values. For instance, assume the CPU core 250 comprises more than one CPU 260. In this case, the RS flag may be used to identify to which of the core's CPUs the packet data is addressed. Alternatively, suppose the CPU core 250 comprises only a single CPU 260 and the CPU prioritizes received packet data as high priority or low priority data. In this situation, the RS flag may be used to indicate whether the received packet data is addressed to the CPU's high-priority or low-priority descriptor ring 410. Of course, in other embodiments the RS flag may select a To-CPU descriptor ring where the CPU core 250 comprises multiple CPUs 260, each of which is associated with one or more prioritized descriptor rings 410. For ease of explanation hereinafter, it is assumed that the CPU core 250 contains a single CPU 260 that does not prioritize in-coming packet data. As such, the RS flag 528 identifies only one possible destination To-CPU descriptor ring 410 stored in the CPU memory 280.

The data section 530 is configured to store a predetermined amount of data, e.g., 8 bytes. In operation, the To-CPU DMA engine 400 "snoops" the contents of the To-CPU data FIFO 500 until it recognizes that a predetermined amount of data has been received or the EOP flag value 524 and/or ERR flag value 526 has been set to indicate the end of the packet. Illustratively, the predetermined amount of data corresponds to the maximum burst size permitted to be transmitted in a single transmission over the HPT bus 240. For example, if the HPT bus's maximum burst size is 64 bytes and each FIFO entry 510 stores 8 bytes of data, then the To-CPU DMA engine 400 monitors the To-CPU data FIFO 500 until eight data sections 530 are filled or until the end of the data packet is reached, whichever occurs first. The To-CPU DMA engine then attempts to transfer the data to a buffer stored in the buffer cache 290.

Figure 6:
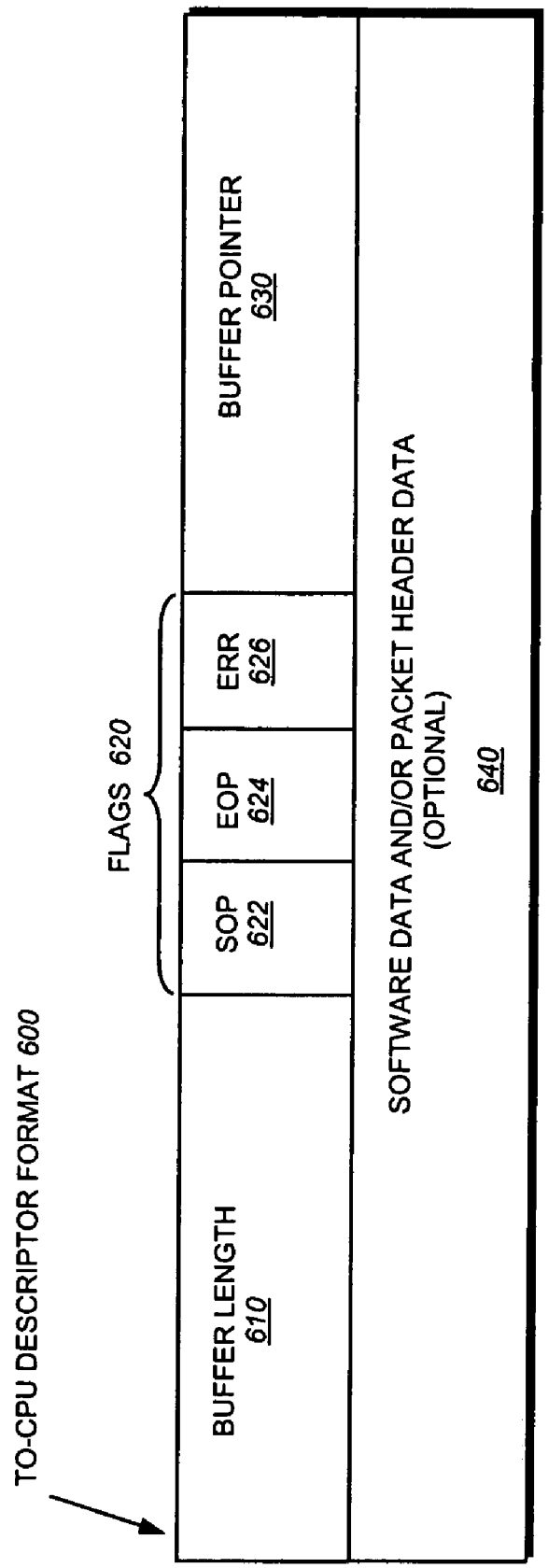
FIG. 6 is a schematic block diagram of an exemplary To-CPU descriptor format that may be used in the To-CPU data transfer of FIG. 4.

FIG. 6 illustrates the format of an exemplary To-CPU descriptor 600 that may be stored in the To-CPU descriptor ring 410. The descriptor includes fields for storing, inter alia, a buffer length 610, one or more flags 620, a buffer pointer 630 and software data and/or packet header data 640. The buffer length 610 stores the amount of data, e.g., in bytes, stored in a buffer referenced by the descriptor 600. The flags 620 provide additional information about the packet data referenced by the descriptor. For instance, the SOP flag 622 may store a value indicating that the buffer stores the start of the received packet 160. Similarly, the EOP flag 624 may indicate that the buffer stores data located at the end of the packet. The ERR flag 626 may be set to a value indicating that the packet data stored in the descriptor's referenced buffer contains an error, e.g., identified by a CRC test or the like.

The buffer pointer 630 stores a value that identifies the memory location of the buffer referenced by the descriptor 600. Preferably, the buffer pointer value stores the memory address of its corresponding buffer in the buffer cache 290. The To-CPU descriptor 600 includes one or more optional fields configured to store software data, e.g., used by software 265 executing on the CPU 260, and/or packet header data associated with the received data packet 160. By storing such software and/or packet header data directly in the descriptor 600, the CPU 260 may be able to process the packet data referenced by the descriptor in a more efficient manner.

Figure 7:
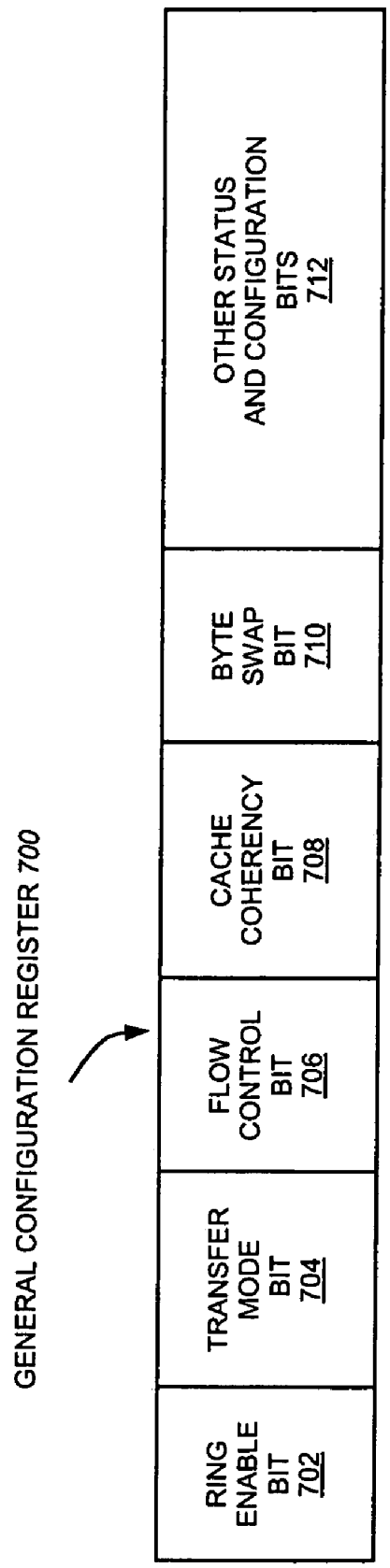
FIG. 7 is a schematic block diagram of an exemplary general configuration register that stores status and configuration information with relation to the To-CPU data transfer of FIG. 4.

Referring again to FIG. 4, the ASIC 300 may include one or more configuration registers 460 that store configuration and status information associated with the To-CPU data transfer. For example, the registers may be configured to store the memory locations of the write pointer 440, the To-CPU descriptor ring 410 and the buffer cache 290 within the CPU memory 280. The registers also may store other configuration information, such as the size of the data buffers in the cache 290, the number of entries in the descriptor ring 410, etc. Furthermore, the registers 460 may be configured to store various parameters, such as a maximum burst size, associated with the HPT bus 240. FIG. 7 illustrates an exemplary general configuration register 700 that may be included among the configuration registers 460. The register 700 contains, inter alia, a ring-enable bit 702, a transfer-mode bit 704, a flow-control bit 706, a cache-coherency bit 708, a byte-swap bit 710, as well as other status and configuration bits 712.

The ring-enable bit 702 stores a value that determines whether the DMA engine 400 is permitted to write descriptors to the descriptor ring 410. In the event that there are multiple descriptor rings 410 stored in the CPU memory 280, the configuration register 700 may include a separate ring-enable bit for each ring. The transfer-mode bit 704 stores a value that indicates whether the DMA engine 400 is permitted to transfer received packet data from the To-CPU data FIFO 500 to the buffer cache 290 before or after the FIFO has received the entire data packet 160. The flow-control bit 706 stores a value that indicates whether the To-CPU DMA engine should perform flow-control operations for the descriptor ring(s) 410. Namely, if flow control is "on," as indicated by the value of the bit 706, the DMA engine invokes conventional flow control mechanisms to manage the rate at which received packet data is transferred to the CPU memory 280. As such, the DMA engine can ensure that data is not being forwarded to the CPU 260 faster than the CPU can process the data, and that there are a sufficient number of "free" entries in the descriptor ring(s) 410 and an adequate supply of available buffers in the buffer cache 290.

The cache-coherency bit 708 stores a value that indicates whether the To-CPU DMA engine 400 is permitted to store descriptors (Steps 5 and 9 in FIG. 4) directly in the CPU cache 270 accessible to the CPU 260. As such, the descriptors can be accessed by the CPU faster than if they were stored and retrieved from the descriptor ring 410. Likewise, the cache-coherency bit also may indicate whether the DMA engine can store the write pointer 440 directly in the CPU cache 270. Here, it is noted that if the DMA engine 400 stores a buffer descriptor directly in the CPU cache, another copy of the descriptor also may be stored in the appropriate entry in the descriptor ring 410. Likewise, the write pointer 440 may be stored in one or both of the CPU cache 270 and CPU memory 280. Those skilled in the art will appreciate that when cache coherency is employed, the DMA engine may be required to ensure proper cache-alignment of the descriptor and/or pointer values stored in the CPU cache.

The byte-swap bit 710 stores a value that indicates whether the DMA engine 400 should byte swap the packet data before the data is transferred to the buffer cache 290. Accordingly, such an implementation may require byte-swapping circuitry and/or logic (not shown) coupled to the To-CPU DMA engine in the ASIC 300. Other status and configuration bits 712 may be included in the general configuration register 700, as well. By way of example, a configuration bit may be set to a value that indicates whether the DMA engine 400 transmits posted or non-posted communications over the HPT bus 240. Another configuration bit may be used to indicate whether an external free buffer cache 1130 is available, as explained in regards to FIG. 11.

C. FROM-CPU DATA TRANSFER

Figure 8:
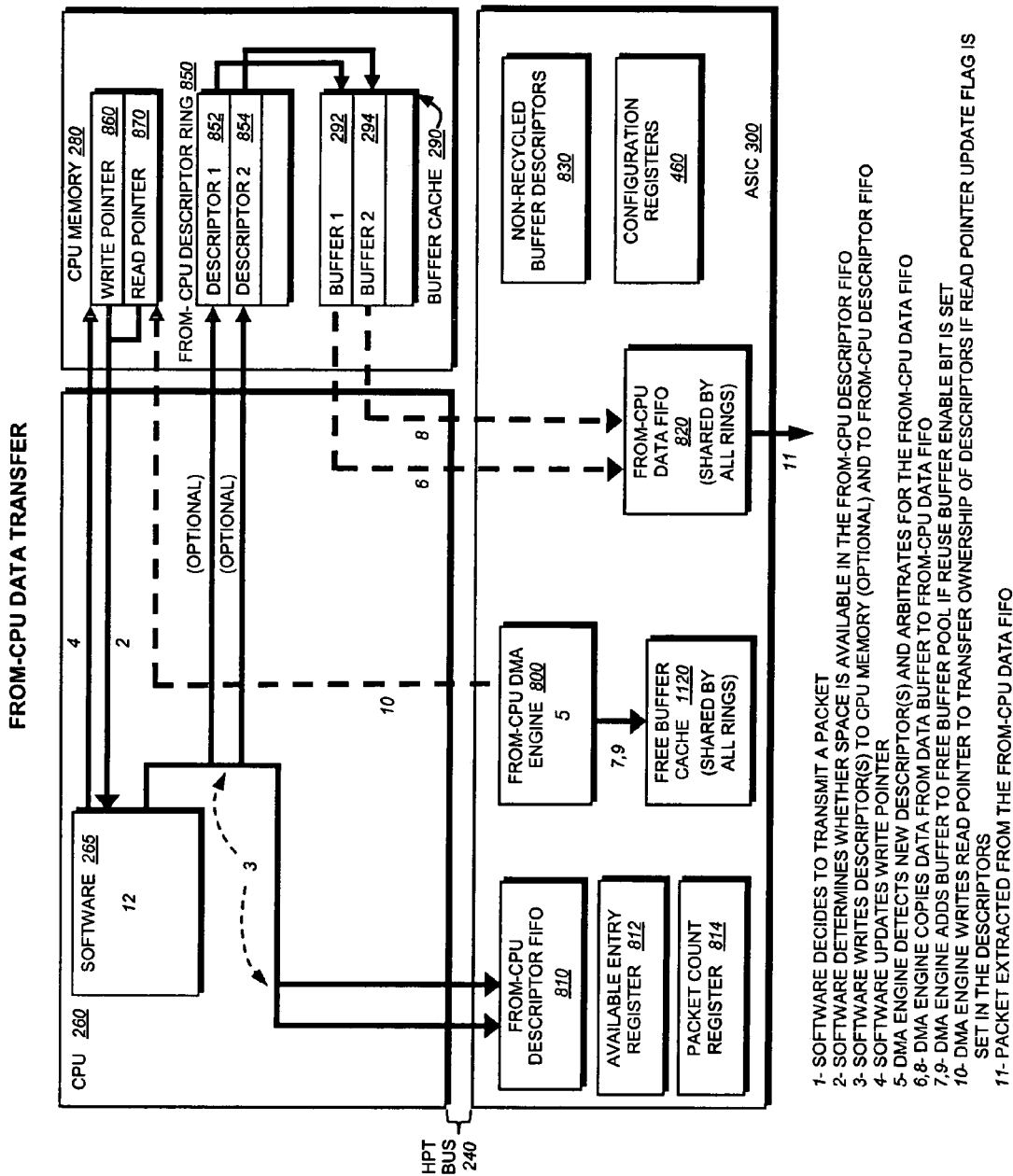
FIG. 8 is a schematic block diagram of an exemplary From-CPU data transfer that may be performed in accordance with the present invention.

FIG. 8 illustrates a schematic block diagram including a sequence of steps that may be employed by the novel HPT data path protocol of the present invention for returning processed data from the forwarding engine 220 to the ASIC 300, i.e., in the From-CPU direction. At Step 1, the software 265 executing on the CPU 260 determines that the data packet 160 has been processed, e.g., and a forwarding determination has been incorporated into the packet's network headers. Next, at Step 2, the software determines whether the buffer descriptors corresponding to the processed packet data can "fit" in a From-CPU descriptor FIFO 810 resident in the ASIC 300. In other words, the software determines whether the FIFO contains enough available entries to store the set of descriptors corresponding to the processed data packet 160. Preferably, the From-CPU descriptor FIFO 810 contains at least enough entries, e.g., 32 entries, to store the largest amount of data, i.e., the largest data packet 160, that may be processed by the CPU 260.

The From-CPU descriptor FIFO 810 is a first-in, first-out queue of descriptors whose referenced data is addressed to a common "destination" in the intermediate network node 200. The destination may be, for example, a processor on a line card 210. Therefore, the ASIC 300 includes a separate FIFO 810 for each possible destination for the processed packet 160. Additionally, each destination may be associated with one or more priority levels, such that different From-CPU descriptor FIFOs may correspond to different priority levels associated with the same destination. For purposes of discussion, only a single From-CPU descriptor FIFO 810 is shown in the ASIC 300, although those skilled in the art will understand that other From-CPU descriptor FIFOs (not shown) may be employed for other destinations and/or priority levels, as well as for other processors in a multi-CPU device.

To determine whether the From-CPU descriptor FIFO 810 contains enough available entries to store the set of descriptors, the software 265 accesses a write pointer 860 and a read pointer 870 associated with the FIFO 810. The write pointer 860 stores an index value corresponding to the next entry of the From-CPU descriptor FIFO in which a descriptor will be written by the CPU 260. The read pointer 870 stores an index value of the next entry read from the FIFO 810. Accordingly, the pointers 870 and 860 essentially reference the head and tail of a descriptor queue implemented within the From-CPU descriptor FIFO 810. Based on the values of the read and write pointers and knowledge of the size of the FIFO, the software 265 can calculate how many entries in the FIFO 810 are available to store new buffer descriptors. Illustratively, the pointers 860 and 870 are stored at predetermined locations in the CPU memory 280.

At Step 3, if the software determines that there are enough available entries in the FIFO 810 to store the processed packet's descriptors, then the set of descriptors is written into the From-CPU descriptor FIFO. Advantageously, in contrast with prior implementations, the processed packet's descriptors are forwarded to the ASIC 300 without having to perform a conventional read transaction over the HPT bus 240. Preferably, the packet's descriptors are written into the FIFO 810 "in order," and the descriptors are transmitted over the HPT bus 240 in units of the bus's maximum burst size, e.g., 64 bytes. Furthermore, the CPU 260 optionally may enqueue the set of descriptors in a From-CPU descriptor ring 850 resident in the CPU memory 280. The From-CPU descriptor ring is managed by the software 265 and provides the CPU 260 with a locally-accessible "mirror" of the contents of the From-CPU descriptor FIFO 810. For example, as shown, the descriptors 852 and 854 corresponding to the processed data packet 160 are enqueued in both the descriptor ring 850 as well as in the descriptor FIFO 810. In this case, the processed packet data is stored in buffers 292 and 294 in the buffer cache 290.

If, at Step 3, the software 265 determines that there are not enough available entries in the From-CPU descriptor FIFO 810 to store the processed packet's set of descriptors, the software may be configured to notify the ASIC 300 of how many entries it needs to store the descriptors. For example, the software may write a count of the number of available entries needed to store the packet's descriptors in an "available entry" register 812 associated with the From-CPU descriptor FIFO 810. In this embodiment, the From-CPU DMA engine 800 monitors the FIFO 810 until the number of available entries equals or exceeds the count value stored in the register 812. When this occurs, the DMA engine 800 may send an interrupt to the CPU 260 to notify the software 265 that the set of descriptors may be written to the descriptor FIFO 810. For instance, the interrupt may include an update of the read pointer value 870 so as to notify the software 265 how many entries are available in the From-CPU descriptor FIFO.

At Step 4, after the set of descriptors have been written to the From-CPU descriptor FIFO 810, the software 265 updates the index stored in the write pointer 860 to coincide with the next index past the last descriptor-FIFO entry in which a descriptor was written. At Step 5, a queue controller (not shown) monitors the contents of the FIFO 810 and increments the value of a "packet-count" register 814 every time a descriptor corresponding to the end of a packet is written to the FIFO 810. As described in FIG. 8 below, the value of an EOP flag 1024 may be used to indicate the end of the packet. When the From-CPU DMA engine 800 identifies a non-zero value stored in the packet-counter register 814, the DMA engine arbitrates for access to a From-CPU data FIFO 820.

The From-CPU data FIFO 820 is configured to store data that has been processed by the CPU 260, regardless of the data's destination in the intermediate network node 200. Thus, although multiple descriptor FIFOs 810 are utilized to differentiate different destinations in the node 200, only a single data FIFO 820 is used to store the processed data that is forwarded to these destinations. In other words, data referenced by descriptors in the FIFOs 810 "share" access to the From-CPU data FIFO 820. For this reason, the DMA engine 800 employs an arbitration protocol, such as a round-robin arbitration protocol, to ensure that data referenced by descriptors in a single descriptor FIFO 810 is transferred to the data FIFO 820 in an orderly manner. It is expressly contemplated that various arbitration protocols may be used to control which descriptor FIFO 810 is permitted to transfer its referenced data to the FIFO 820. Also, it is noted that the From-CPU data FIFO contains a predetermined number of data entries, e.g., 32 entries, that are configured to store the largest data packet 160 that may be processed by the CPU 260.

As shown, there is only a single From-CPU descriptor FIFO 810, so the From-CPU DMA engine 800 does not have to arbitrate among a plurality of descriptor FIFOs 810. Thus, upon identifying a non-zero value stored in the packet-count register 814, the DMA engine 800 begins transferring the processed packet data, e.g., stored in the buffers 292 and 294. At Step 6, the data stored in the buffer 292 is transferred to the From-CPU data FIFO 820. If the DMA engine 800 determines that the buffer descriptor 852 may be reused, e.g., based on the value of the descriptor's reuse-buffer enable flag 1030 (described below), then the DMA engine cooperates with the buffer controller 1110 to return the descriptor to the free buffer cache 1120. Otherwise, if the descriptor is determined not be reused, then it is added to a list of non-recycled buffer descriptors 830, e.g., stored at a predetermined memory location in the ASIC 300, to be returned to the CPU.

The process of dequeueing a descriptor from the From-CPU descriptor FIFO 810, transferring the data referenced by the dequeued descriptor to the From-CPU data FIFO 820 and returning the descriptor to the pool of free buffer descriptors in the free buffer cache 920 or to the list of non-recycled descriptors 830 (i.e., Steps 6–7) is repeated until the entire processed packet 160 has been transferred to the data FIFO 820. For instance, as shown, the processed packet 160 is stored in two buffers 292 and 294, respectively referenced by the buffer pointers 852 and 854. Accordingly, Steps 6–7 are performed for transferring the first portion of the received packet to the buffer 292 and the Steps 8–9 are performed in the same manner for transferring the latter portion of the packet to the buffer 294. In this case, the buffer 292 is entirely filled, whereas the buffer 294 may not be.

At Step 10, the From-CPU DMA engine 800 updates the index value stored in the read pointer 870. Operationally, in response to a read-pointer-update request from the software 265, the DMA engine forwards an interrupt to the CPU 260 that indicates the read pointer value 870 has been updated. As described below, the software may request the read-pointer update by setting a read-pointer update flag 1028 in one or more of the descriptors 852 and 854 written to the From-CPU descriptor FIFO 810. Lastly, at Step 11, the processed data packet 160 is extracted from the FIFO 820 and forwarded to the backplane bus interface 310 which, in turn, transfers the packet over the backplane bus 230 to its associated destination.

Figure 9:
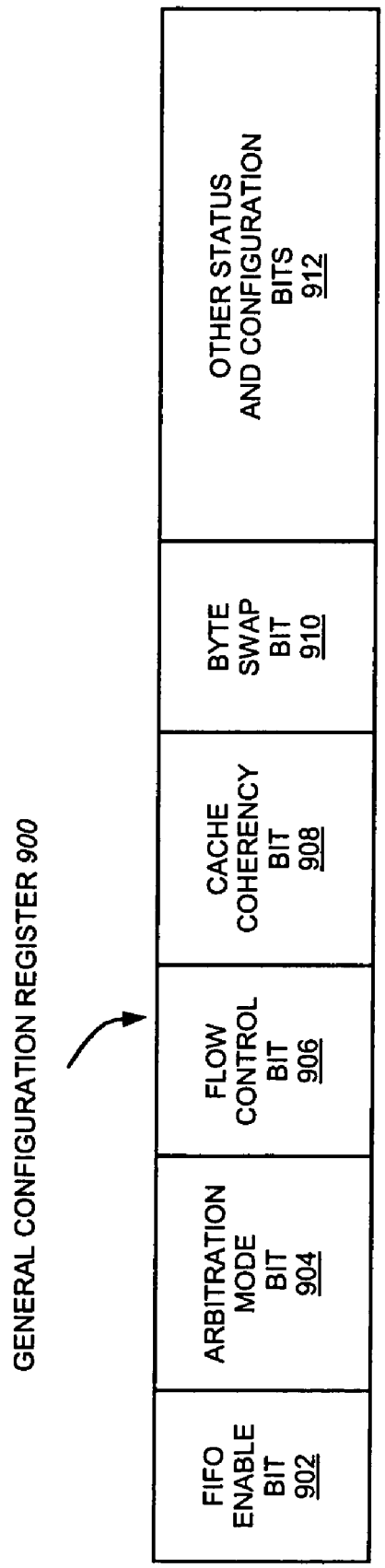
FIG. 9 is a schematic block diagram of an exemplary general configuration register that stores status and configuration information with relation to the From-CPU data transfer of FIG. 8.

As noted, the configuration registers 460 in the ASIC 300 may store configuration and status information associated with the To-CPU data transfer described in FIG. 4. In addition, the registers 260 also may include configuration and status information associated with the From-CPU data transfer shown in FIG. 8. For instance, the registers may be configured to store the memory location of the read pointer 870, the depth of the From-CPU descriptor ring 850, etc. Further, the general configuration register 700 (or another register) may include additional information relevant for the From-CPU data transfer. For example, FIG. 9 illustrates an exemplary general configuration register 900 that may be included among the configuration registers 460 to store information related to the From-CPU data transfer. Alternatively, the contents of the register 900 may be incorporated into the general configuration register 700. The register 900 contains, inter alia, a FIFO-enable bit 902, an arbitration-mode bit 904, a flow-control bit 906, a cache-coherency bit 908, a byte-swap bit 910, as well as other status and configuration bits 912.

The FIFO-enable bit 902 stores a value that determines whether the software 265 is permitted to write descriptors to the From-CPU descriptor FIFO 710. In the event that there are multiple From-CPU descriptor FIFOs 810 in the ASIC 300, the configuration register 900 may include a separate FIFO-enable bit for each FIFO 810. The arbitration-mode bit 904 stores a value that indicates whether the DMA engine 800 transfers a buffer of data (i.e., Buffer Mode) or an entire packet (i.e., Packet Mode) in response to the FIFO 810 "winning" arbitration among a plurality of From-CPU descriptor FIFOs.

The flow-control bit 906 stores a value that indicates whether the From-CPU DMA engine 800 should perform flow-control operations for the descriptor FIFOs 810. Namely, if flow control is "on," as indicated by the value of the bit 906, the DMA engine 800 invokes conventional flow control mechanisms to manage the rate at which the CPU's processed data is transferred from the buffer cache 290 to the From-CPU data FIFO 820, as compared with the rate at which data is extracted from the FIFO 820. Various flow control techniques may be employed. For instance, the data flow into or out of the FIFO 820 may be adjusted on a packet-by-packet basis, so a data transfer is not interrupted in the middle of a packet's transfer. Alternatively, other flow control techniques may moderate the data flow on a byte-by-byte basis. Using such flow control mechanisms, the DMA engine can ensure that there are a sufficient number of available entries in the From-CPU data FIFO 820, thereby preventing stalling of the DMA engines 400 and 800 and consuming excessive CPU bandwidth in the forwarding engine 220.

The cache-coherency bit 908 stores a value that indicates whether the From-CPU DMA engine 800 is permitted to store the read pointer 870 (Step 10 in FIG. 8) directly in the CPU cache 270 accessible to the CPU 260. Those skilled in the art will appreciate that when cache coherency is employed, the DMA engine may be required to ensure proper cache-alignment of the descriptor and/or pointer values stored in the CPU cache. The byte-swap bit 910 stores a value that indicates whether the From-CPU DMA engine 800 should byte swap the processed data before the data is transferred into the FIFO 820. Accordingly, such an implementation may require byte-swapping circuitry and/or logic (not shown) coupled to the From-CPU DMA engine in the ASIC 300. Other status and configuration bits 912 may be included in the general configuration register 900, as well. By way of example, a configuration bit 912 may be set to a value that indicates whether the DMA engine 800 transmits posted or non-posted communications over the HPT bus 240.

Figure 10:
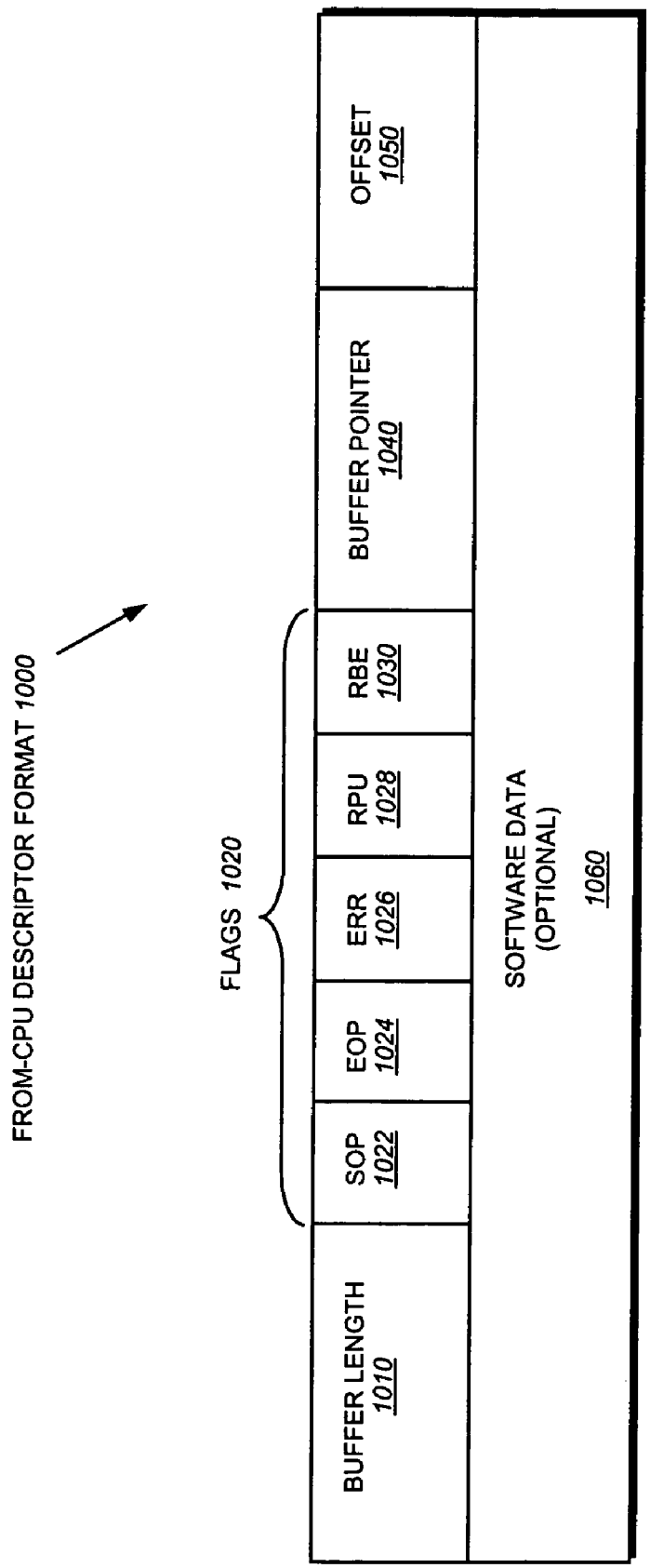
FIG. 10 is a schematic block diagram of an exemplary From-CPU descriptor format that may be used in the From-CPU data transfer of FIG. 8.

FIG. 10 illustrates an exemplary From-CPU buffer descriptor 1000 that may be used in accordance with the illustrative From-CPU data transfer. The descriptor includes, inter alia, a buffer length 1010, a set of one or more flags 1020, a buffer pointer 1040, a buffer offset value 1050 and software data 1060. The buffer length 1010 stores the amount of data, e.g., in bytes, stored in a buffer referenced by the descriptor 1000. The flags 1020 provide information about the data referenced by the descriptor. The flags may include, for example, a SOP flag 1022, an EOP flag 1024, a ERR flag 1026, a read-pointer update (RPU) flag 1028 and a reuse-buffer enable (RBE) flag 1030. The values of these flags may be set by the software 265 before the descriptors are transferred over the HPT bus 240 and stored in the appropriate From-CPU descriptor FIFO 810.

The SOP flag 1022 stores a value indicating whether the descriptor's referenced buffer contains the beginning of the processed data packet 160. The EOP flag 1024 stores a value indicating whether the descriptor's referenced buffer contains the end of the processed packet. The ERR flag 1026 may be set to a value that indicates whether the packet data stored in the referenced buffer contains an error, e.g., identified by a CRC test or the like.

The RPU flag 1028 may be set by the software 265 to request an updated index value of the read pointer 870. In response to identifying that the RPU flag is set equal to a value indicating a request for a read-pointer update, the From-CPU DMA engine 800 updates the read pointer 870 and forwards an interrupt to the CPU 260. The interrupt identifies the From-CPU descriptor FIFO 810 (if there are multiple FIFOs 810). Because the read pointer 870 is not updated after every descriptor is read from the FIFO 810, the read pointer may not store an accurate index value until the RPU flag is set and the read pointer value is updated.

The RBE flag 1030 may be set to a value that indicates whether the software 265 permits the descriptor 1000 to be reused, e.g., for a subsequent To-CPU data transfer. If the RBE flag value indicates that the descriptor is to be "recycled," then the From-CPU DMA engine 800 cooperates with the buffer controllers 1110 to add the descriptor 1000 to the free buffer cache 1120. On the other hand, if the descriptor 1000 is not to be recycled, i.e., the descriptor references data that the CPU 260 plans to access again in the future, then the descriptor is stored in the list of non-recycled buffer descriptors 830, e.g., stored in a predetermined memory location in the ASIC 300. Preferably, descriptors are stored in the list of non-recycled descriptors until either (i) the list contains enough descriptors to form a maximum burst size packet over the HPT bus 240 or (ii) a predetermined time interval expires. The non-recycled descriptors are then returned to the software 265 as a single HPT bus packet. The descriptors are preferably returned to the software the next time an interrupt is sent from the To-CPU DMA engine 400 to the CPU 260.

The buffer pointer 1040 stores a value that identifies the memory location, e.g., in the CPU memory 280, of the buffer referenced by the descriptor 1000. The offset value 1050 stores the offset of the processed data within the buffer referenced by the buffer pointer 1040. The offset value preferably specifies a number of bytes measured from the beginning of the referenced data buffer to indicate the relative position of the CPU's processed data within the buffer. The From-CPU descriptor 1000 includes a software data section 1060 that optionally may be used, e.g., by the software 265, to store other information associated with the descriptor or its referenced data. For example, the software data 1060 may store an identifier that indicates the particular destination for the descriptor's referenced data in the intermediate network node 200.

D. BUFFER MANAGEMENT

Figure 11:
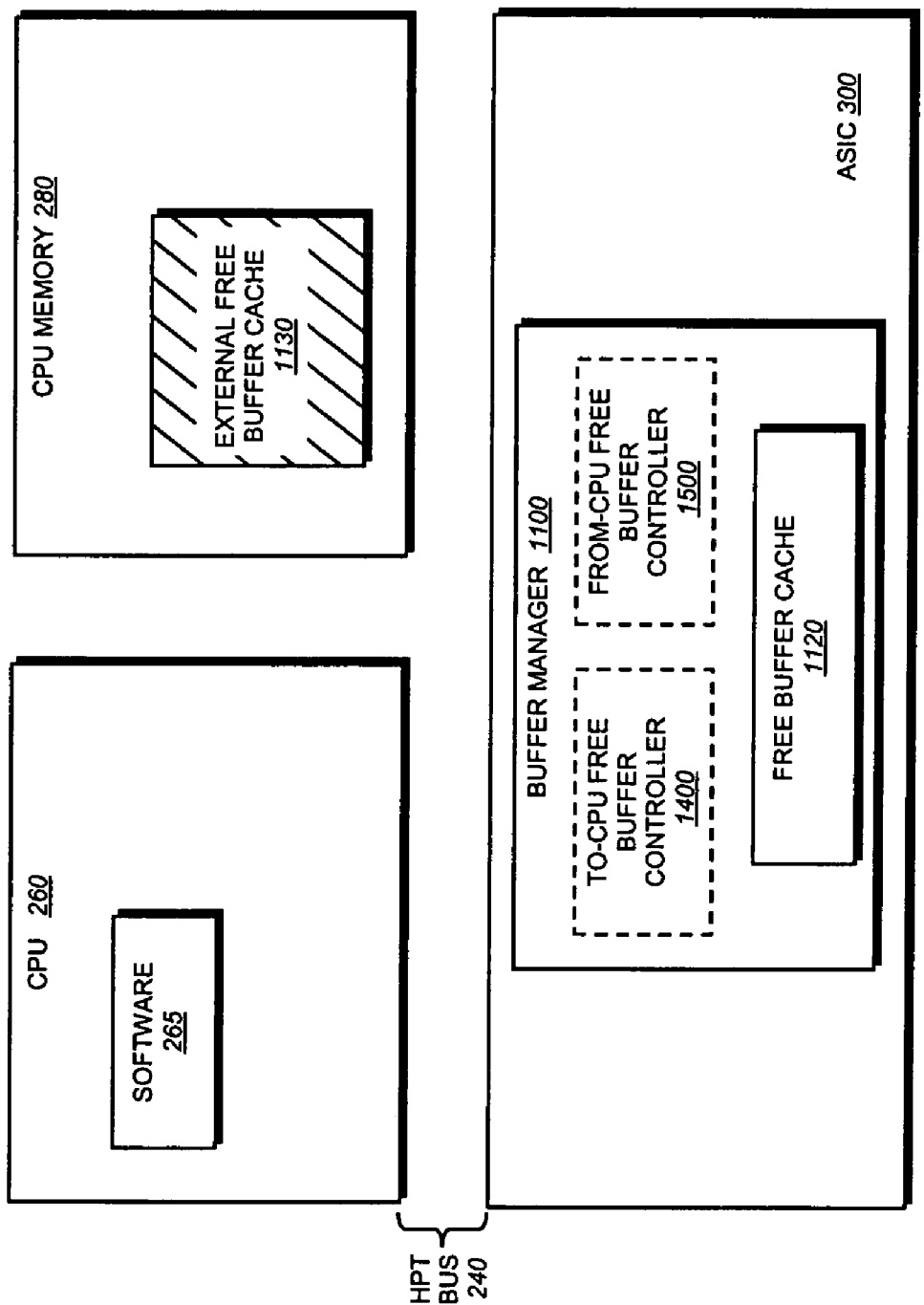
FIG. 11 is a schematic block diagram of an illustrative buffer manager that manages free buffer descriptors stored in internal and external free buffer caches.

FIG. 11 illustrates an exemplary free-buffer manager 1100 that is configured to manage the pool of free buffer descriptors in the free buffer cache 1120. The buffer manager 1100 includes, among other things, a To-CPU free buffer controller 1400 and a From-CPU free buffer controller 1500. The controllers 1400 and 1500 enable the buffer manager 1100 to send and receive buffer descriptors over the HPT bus 240, e.g., between the ASIC 300 and the forwarding engine 220. The free buffer manager 1100 is configured to monitor the number of free buffer descriptors available in the free buffer cache 1120. For instance, the free buffer manager may issue an error message if the pool of free buffer descriptors becomes, e.g., empty or full.

Illustratively, the free buffer cache 1120 stores a predetermined number of free buffer descriptors, e.g., 1024 descriptors. However, in accordance with an aspect of the invention, the buffer manager 1100 can "extend" the cache 1120 to an external memory, e.g., an external free buffer cache 1130 stored in the CPU memory 280. The external free buffer cache 1130 is preferably inaccessible to the CPU 260, and access to the external cache is preferably determined by the value of a predetermined bit in the general configuration register 700 (or 900). Advantageously, the free buffer manager 1100 controls movement of free buffer descriptors between the ASIC's internal free buffer cache 1120 and its external free buffer cache 1130 in a manner that is transparent to the CPU 260. In operation, the buffer manager 1100 transfers free buffer descriptors between the internal and external caches to ensure that a sufficient number of free buffer descriptors are available in the both the ASIC 300 and in the CPU memory 280.

Figure 12:
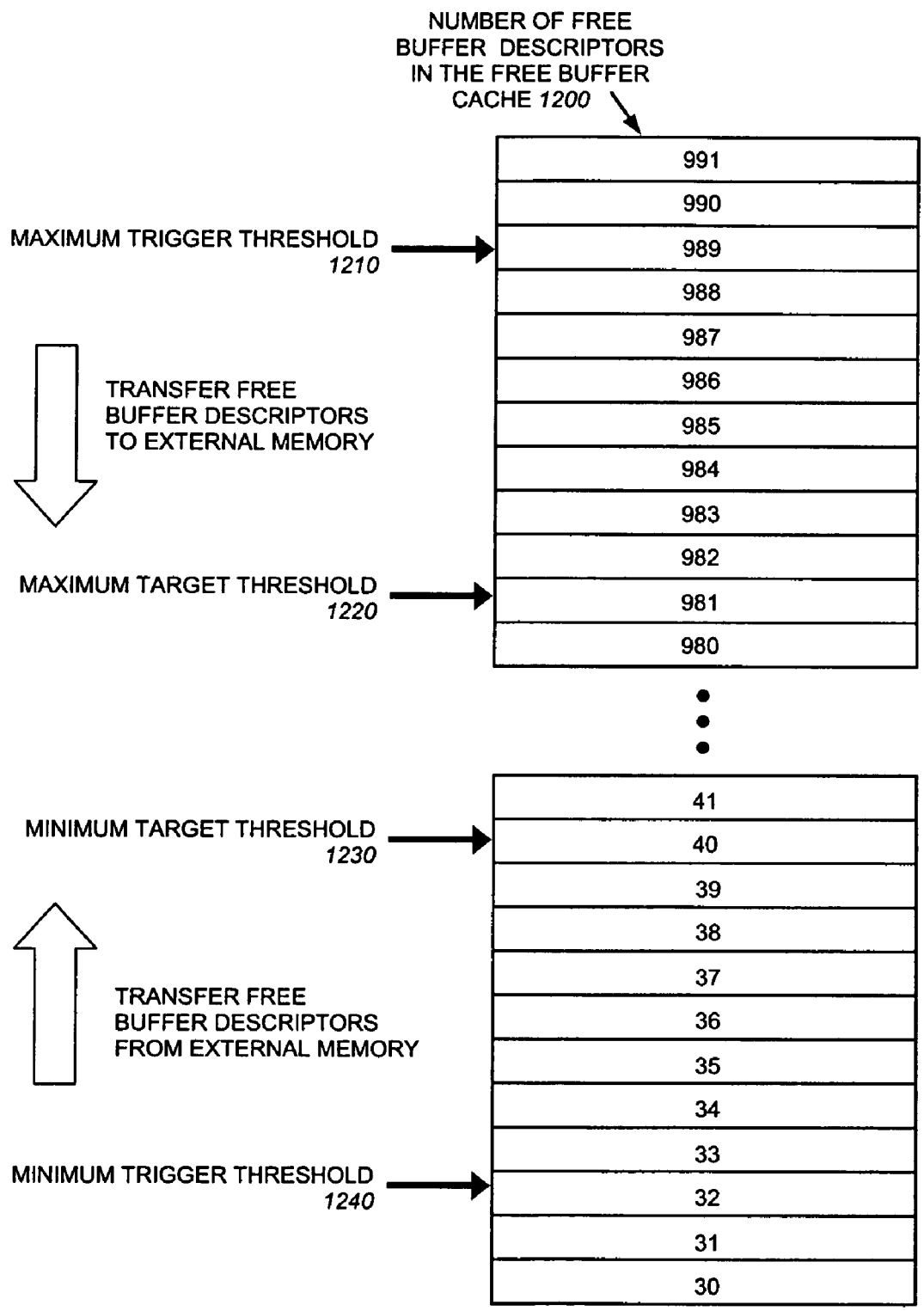
FIG. 12 is a schematic block diagram of various threshold levels that determine when the buffer manager of FIG. 11 transfers free buffer descriptors between its internal and external free buffer caches.

FIG. 12 is a diagram illustrating when the free buffer manager 1100 transfers free buffer descriptors between its internal cache 1120 and its external cache 1130. The buffer manager 1100 monitors the number 1200 of free buffer descriptors in the free buffer cache 1120 relative to a maximum trigger threshold 1210, a maximum target threshold 1220, a minimum target threshold 1230 and a minimum trigger threshold 1240. The maximum trigger threshold 1210 is set to a value that is greater than the maximum target threshold 1220; the minimum trigger threshold 1240 is set to a value that is less than the minimum target threshold 1230. The threshold values 1210–1240 are preferably predetermined values, e.g., stored in the ASIC's configuration registers 460. However, it is also contemplated that the buffer manager 1100 may be configured to dynamically adjust the threshold values 1210–1240 in response to various run-time conditions. For purposes of illustration, an exemplary set of threshold values is depicted.

When the number of free buffer descriptors in the internal cache 1120 becomes greater than the maximum trigger threshold value 1210, the buffer manager 1100 transfers free buffer descriptors to the external cache 1130 until the number of descriptors in the internal cache is less than or equal to the maximum target threshold 1220. Similarly, when the number of free buffer descriptors in the internal cache 1120 becomes less than the minimum trigger threshold value 1240, the buffer manager 1100 transfers free buffer descriptors from the external cache 1130 into the internal cache 1120 until the number of descriptors in the internal cache becomes greater than or equal to the minimum target threshold 1230.

Figure 13:
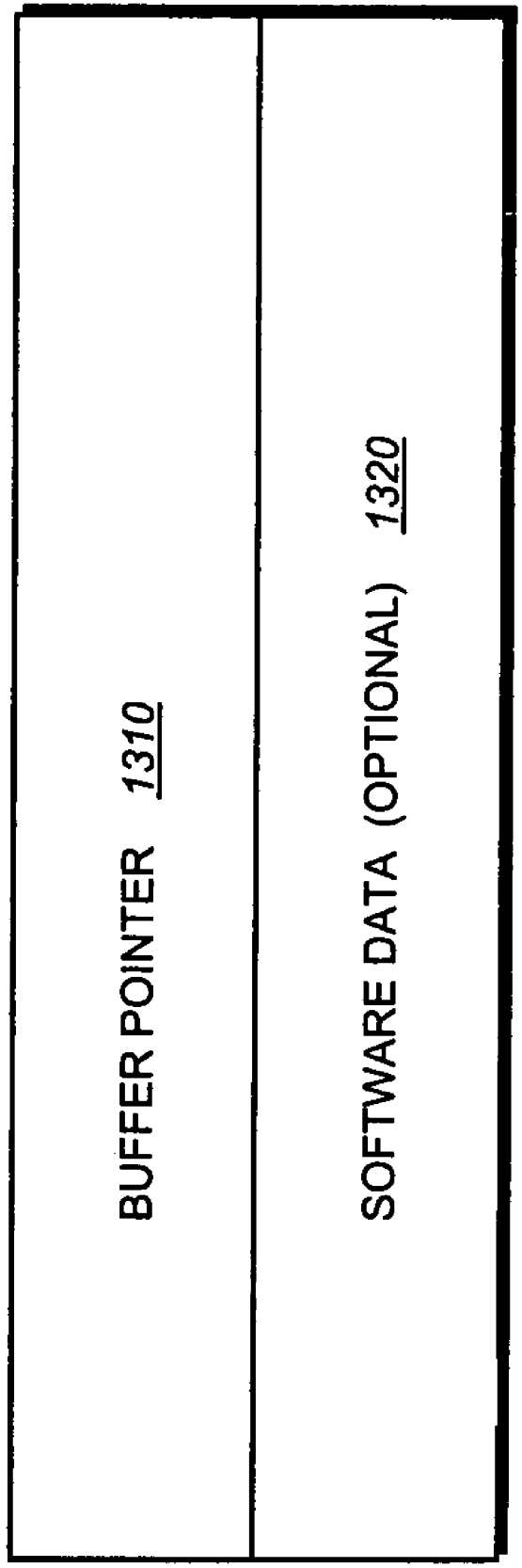
FIG. 13 is a schematic block diagram of an exemplary free buffer descriptor format that may be managed by the buffer manager of FIG. 11.

FIG. 13 illustrates an exemplary free buffer descriptor 1300 comprising, inter alia, a buffer pointer 1310 and software data 1320. The buffer pointer 1310 stores a value that identifies the memory location, e.g., in the CPU memory 280, of a data buffer referenced by the descriptor 1000. The buffer referenced by the free buffer descriptor is available to store data for the CPU 260 to process. The free buffer descriptor 1300 also includes a software data section 1320 that optionally may be used to store other information associated with the descriptor.

Figure 14:
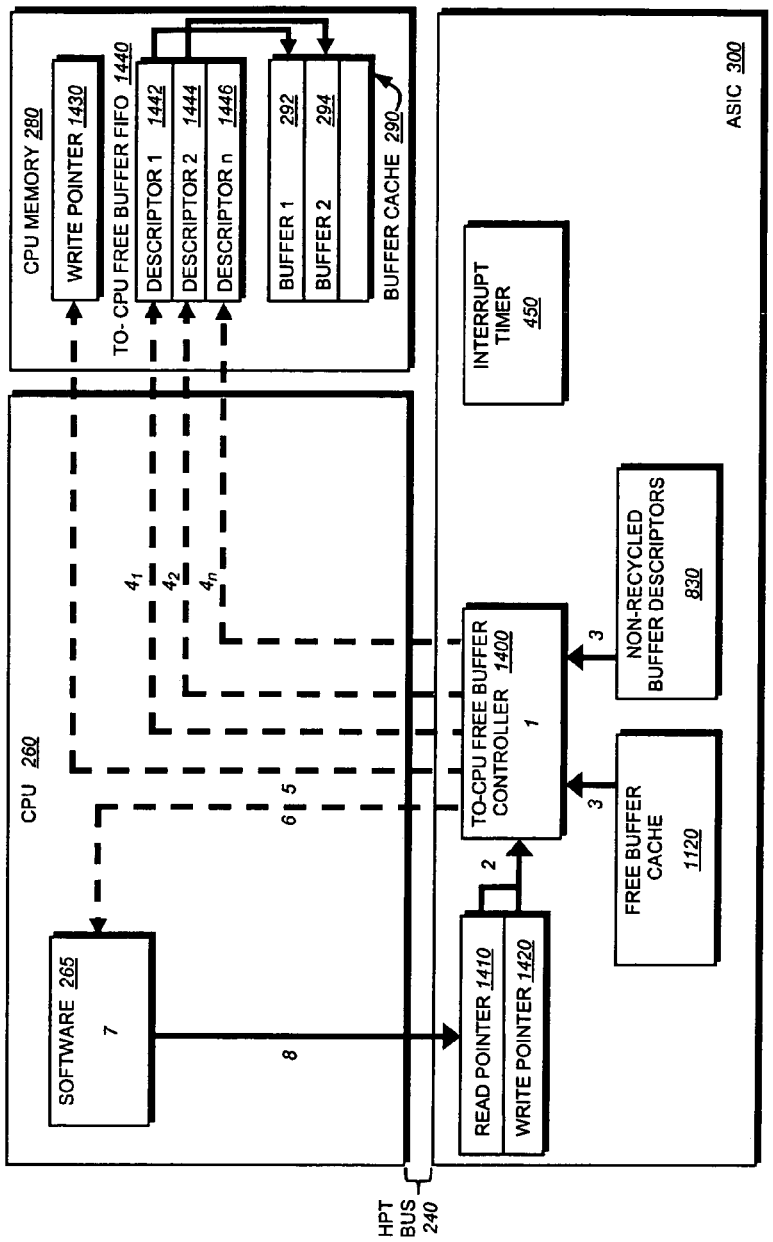
FIG. 14 is a schematic block diagram of an exemplary To-CPU free buffer transfer that may be performed in accordance with the present invention.

FIG. 14 illustrates a schematic block diagram including a sequence of steps for transferring free buffer descriptors from the ASIC 300 to the forwarding engine 220. At Step 1, the To-CPU free buffer controller 1400 determines whether one or more free buffer descriptors should be transferred to the forwarding engine. More specifically, the controller 1400 returns free buffer descriptors to the CPU memory 280 when the pool of free buffer descriptors stored in the caches 1120 and 1130 increases above a predetermined "high water" level. In addition, the controller also returns descriptors stored in the list of non-recycled buffer descriptors 830, i.e., descriptors whose RBE flags 1030 indicate that the software requests the descriptors to be returned.

At Step 2, the controller 1400 determines whether there are enough available entries in a To-CPU free buffer FIFO 1440 to store the transferred free buffer descriptors. The FIFO 1440 stores an ordered list (queue) of free buffer descriptors that may be accessed by the software 265. To determine the number of available entries in the FIFO 1440, the To-CPU free buffer controller accesses a read pointer 1410 and a write pointer 1420 associated with the FIFO 1440. The read pointer stores an index value corresponding to the next entry in the FIFO that will be accessed by the CPU 260. The write pointer stores an index value corresponding to the next entry in which a free buffer descriptor will be written in the FIFO 1440. Based on the values of the pointers 1410 and 1420 and with knowledge of the depth of the FIFO, the controller 1400 can calculate how many entries in the FIFO 1440 are available to store the free buffer descriptors.

The read and write pointers 1410 and 1420 are stored in predetermined memory locations, such as registers, in the ASIC 300. The index stored by the read pointer 1410 is written by the CPU 260, and the controller 1400 is permitted read-only access to this value. The write pointer 1420 is preferably only accessible to the controller 1400. The ASIC 300 copies the value of the write pointer 1420 to the write pointer 1430, e.g., stored at a predetermined location in the CPU memory 280. The controller 1400 updates the ASIC's write pointer 1420 every time a free buffer descriptor is written to the FIFO 1440. However, the CPU's write pointer 1430 is only updated upon expiration of the interrupt timer 450. More specifically, when the timer 450 expires, the value of the write pointer 1430 is updated and an interrupt is sent to the CPU 260. Preferably, the write pointer 1430 is updated at substantially the same time as when the write pointer 440 is updated. In this way, the same interrupt may be used to notify the CPU of both write-pointer modifications. In such an embodiment, the write pointers 440 and 1430 may be stored in a common "write-pointer" data structure 284 in the CPU memory 280.

At Step 3, the To-CPU free buffer controller 1400 acquires the free buffer descriptors that are transferred to the To-CPU free buffer FIFO 1440. At Step 4, the descriptors are transferred over the HPT bus 240 and enqueued in the FIFO 1440. The descriptors are transmitted, when possible, in accordance with the HPT bus's maximum burst size. As shown, the descriptors 1442, 1444 and 1446 are copied into the FIFO 1440. However, those skilled in the art will understand that an arbitrary number n of free buffer descriptors may be transferred, so long as there are enough entries in the FIFO 1440 to store the transferred descriptors. At Step 5, after the timer 450 expires, the value of the write pointer 1430 is updated. Next, at Step 6, an interrupt is forwarded to the CPU 260 informing it that the value of the pointer 1430 is updated and thus free buffers have been transferred to the FIFO 1440. At Step 7, the software 265 executing on the CPU 260 reads (i.e., dequeues) a descriptor from the To-CPU free buffer FIFO 1440. Then, at Step 8, the software writes an update to the read pointer value 1410 stored in the ASIC 300.

Figure 15:
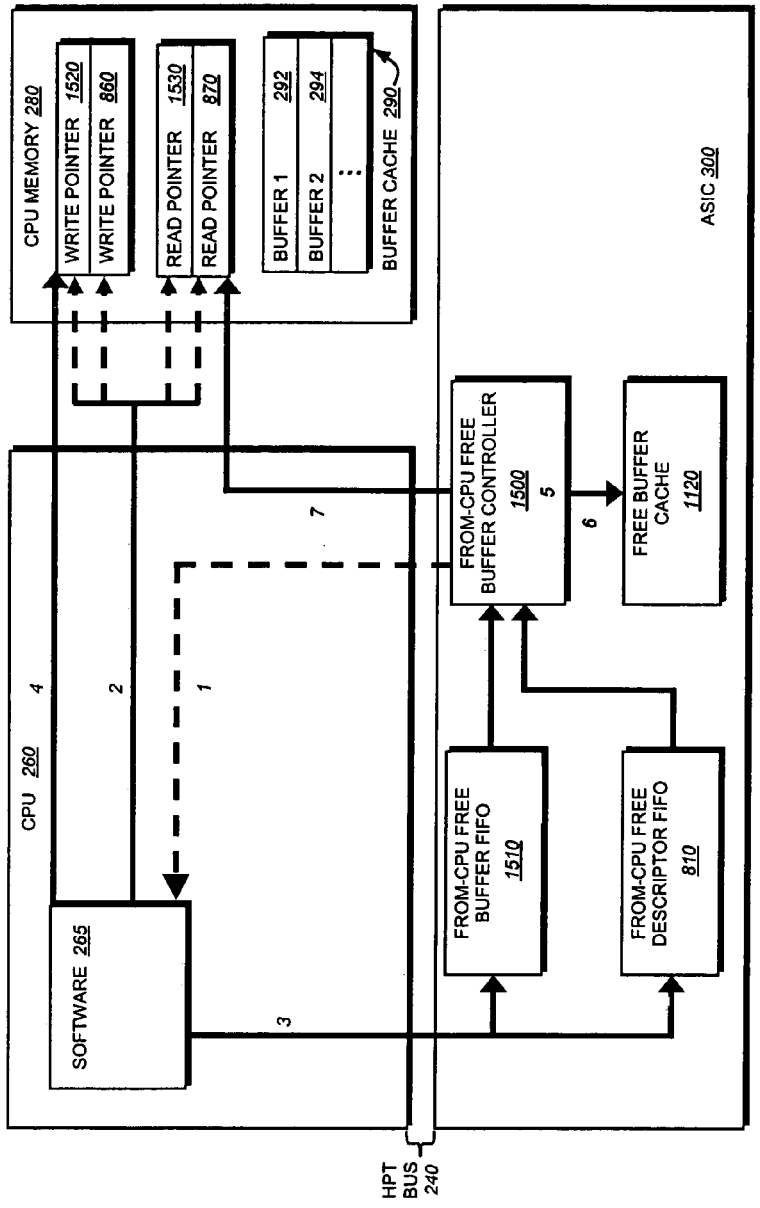
FIG. 15 is a schematic block diagram of an exemplary From-CPU free buffer transfer that may be performed in accordance with the present invention.

FIG. 15 illustrates a schematic block diagram including a sequence of steps for transferring free buffer descriptors from the forwarding engine 220 to the ASIC 300. At Step 1, the From-CPU free buffer controller 1500 sends an interrupt to the CPU 260 to indicate that the controller has determined that the number of free buffer descriptors in the buffer cache 1120 is less than a predetermined "low water" level. In accordance with the illustrative embodiment, the software 265 responds to the interrupt by transferring one or more free buffer descriptors to the From-CPU descriptor FIFO 810 or to a From-CPU free buffer FIFO 1510. For simplicity, assume the software transfers a single free buffer descriptor. If the descriptor is transferred to the From-CPU descriptor FIFO 810, the software 265 sets the descriptor's buffer length 1010 equal to zero to indicate that the descriptor is a free buffer descriptor, thereby distinguishing the free buffer descriptor from other descriptors enqueued in the FIFO 810. On the other hand, every descriptor enqueued in the From-CPU free buffer FIFO 1510 is a free buffer descriptor. Notably, the FIFO 1510 may be optimized, e.g., using cache-coherency, flow control, etc., as previously described, and the general configuration register 700 (or 900) may include status and configuration settings to that end.

At Step 2, the software 265 determines whether there is an available entry in either the From-CPU descriptor FIFO 810 or the From-CPU free buffer FIFO 1510. To determine if a selected one of the FIFOs 810 and 1510 contains an available entry, the software reads a pair of read and write pointers associated with the selected FIFO. For instance, as previously discussed, the FIFO 810 is associated with the write pointer 860 and read pointer 870 stored in the CPU memory 280. Similarly, the FIFO 1510 is associated with a write pointer 1520 and a read pointer 1530, also stored in the memory 280. Preferably, the CPU memory 280 comprises separate write-pointer and read-pointer data structures 284, and each of the data structures is located at a predetermined memory address, e.g., stored in one or more of the configuration registers 460. Thus, the write pointers 1520 and 860 may be located at known offsets in the write-pointer data structure, and the read pointers 1530 and 870 located at known offsets in the read-pointer data structure. Of course, the write-pointer and read-pointer data structures may be configured to store additional write and read pointer values, as well as other information.

At Step 3, the software 265 writes the free buffer descriptor over the HPT bus 240 to the appropriate FIFO in the ASIC 300. Then, at Step 4, the software updates the value of the write pointer 1520 or 860 corresponding to the FIFO in which the free buffer descriptor was written. At Step 5, the From-CPU free buffer controller 1500 detects that the free buffer descriptor has been received. For instance, the controller may identify a zero-length descriptor enqueued in the From-CPU descriptor FIFO 810 or may identify a new descriptor enqueued in the From-CPU free buffer FIFO 1510. At Step 6, the controller 1500 dequeues the free buffer descriptor from the FIFO at which it was received and adds the dequeued descriptor to the free buffer cache 1120. Then, at Step 7, in response to receiving a descriptor having its RPU flag 1028 set, the controller 1500 updates the value of the read pointer 1530 or 870 associated with the FIFO from which the free buffer descriptor was dequeued.

E. CONCLUSION

The foregoing has been a detailed description of illustrative embodiments of the invention. Various modifications and additions can be made without departing from the spirit and scope of the invention. For example, the illustrative embodiment is directed to a HPT data path protocol used to transfer data between an ASIC 300 and a forwarding engine 220 in an intermediate network node. However, it is expressly contemplated that the data path protocol described herein is generic in its application and may be useful for any data communications between devices coupled over a split transaction bus, such as a HyperTransport bus. As such, the novel data path protocol is not limited only to those embodiments described herein.

Further, although the illustrative embodiment describes separate To-CPU and From-CPU DMA engines 400 and 800, those skilled in the art will appreciate that the operations of the DMA engines 400 and 800 may be implemented by a single DMA engine. Similarly, the To-CPU and From-CPU free buffer controllers 1400 and 1500 may be combined in the buffer manager 1100. Also, while separate general configuration registers 700 and 900 may be included in the registers 460, the contents of the general configuration registers 700 and 900 may be merged into a single register.

It is expressly contemplated that the teachings of this invention can be implemented as software, including a computer-readable medium having program instructions executing on a computer, hardware, firmware, or a combination thereof. The inventive technique therefore may be implemented in various combinations of hardware and/or software. Accordingly, this description is meant to be taken only by way of example and not to otherwise limit the scope of the invention.

What is claimed is:

1. A method for efficiently managing a set of data buffers accessible to first and second devices interconnected by a bus, the method comprising:

storing a set of free buffer descriptors in a buffer cache accessible to the first device, each free buffer descriptor referencing a respective data buffer available to store data;

determining whether the number of descriptors in the set of free buffer descriptors is greater than a predetermined threshold value; and transferring, in response to the number of descriptors being greater than the predetermined threshold value, free buffer descriptors from the first device to the second device until the number of descriptors in the set of free buffer descriptors is less than the predetermined threshold value.

2. The method of claim 1, further comprising:
adjusting the number of free buffer descriptors stored in the buffer cache in accordance with a data path protocol implemented over the bus between the first and second devices.

3. The method of claim 1, further comprising:
storing at least one descriptor in the set of free buffer descriptors in a memory that is external to the first device; and storing the remaining descriptors in the set of free buffer descriptors in the buffer cache located in a memory that is internal to the first device.

4. The method of claim 3, wherein the external memory is located in the second device.

5. The method of claim 3, further comprising:
transferring descriptors in the set of free buffer descriptors between the internal and external memories in a manner that is transparent to the second device.

6. The method of claim 5, further comprising:
transferring, in response to the number of free buffer descriptors in the buffer cache being greater than a maximum trigger threshold value, free buffer descriptors from the internal memory to the external memory until the number of descriptors in the buffer cache is less than or equal to a maximum target threshold value.

7. The method of claim 5, further comprising:
transferring, in response to the number of free buffer descriptors in the buffer cache being less than a minimum trigger threshold value, free buffer descriptors from the external memory to the internal memory until the number of descriptors in the buffer cache is greater than or equal to a minimum target threshold value.

8. The method of claim 1, further comprising:
transferring free buffer descriptors from the second device to the first device;
storing the free buffer descriptors transferred from the second device into the buffer cache.

9. The method of claim 8, wherein the step of transferring free buffer descriptors from the second device to the first device further comprises:
storing the free buffer descriptors transferred from the second device in a free-buffer first in, first out (FIFO) queue located in the first device.

10. The method of claim 8, wherein the step of transferring free buffer descriptors from the second device to the first device further comprises:
modifying the contents of the free buffer descriptors transferred from the second device to indicate that the transferred descriptors reference respective data buffers containing zero bytes of data.

11. The method of claim 1, wherein the bus is a split transaction bus.

12. A system configured to efficiently manage a set of data buffers, the system comprising:

a central processing unit (CPU);

a To-CPU direct memory access (DMA) engine configured to transfer data to the CPU for processing, the data being transferred to one or more data buffers in the set of data buffers;

a From-CPU DMA engine configured to retrieve processed data from one or more data buffers in the set of data buffers;

a buffer cache configured to store a set of free buffer descriptors, each free buffer descriptor in the set of free buffer descriptors referencing a respective data buffer available to store data;

a buffer manager configured to retrieve free buffer descriptors from the buffer cache and supply the retrieved free buffer descriptors to the To-CPU DMA engine, and further configured to receive free buffer descriptors from the From-CPU DMA engine and return the received free buffer descriptors to the buffer cache.

13. The system of claim 12, wherein the buffer manager is further configured to receive non-recycled descriptors from the From-CPU DMA engine and forward the non-recycled descriptors to the CPU.

14. The system of claim 12, wherein the buffer manager is further configured to transfer free buffer descriptors between first and second devices interconnected by a bus.

15. The system of claim 14, wherein the buffer manager transfers free buffer descriptors from the buffer cache located in the first device to an external memory resident in the second device.

16. The system of claim 14, wherein the bus is a split transaction bus.

17. An apparatus for efficiently managing a set of data buffers accessible to first and second devices interconnected by a bus, the apparatus comprising:

means for storing a set of free buffer descriptors in a buffer cache accessible to the first device, each free buffer descriptor referencing a respective data buffer available to store data;

means for determining whether the number of descriptors in the set of free buffer descriptors is greater than a predetermined threshold value; and means for transferring, in response to the number of descriptors being greater than the predetermined threshold value, free buffer descriptors from the first device to the second device until the number of descriptors in the set of free buffer descriptors is less than the predetermined threshold value.

18. The apparatus of claim 17, further comprising:

means for adjusting the number of free buffer descriptors stored in the buffer cache in accordance with a data path protocol implemented over the bus between the first and second devices.

19. The apparatus of claim 17, further comprising:

means for storing at least one descriptor in the set of free buffer descriptors in a memory that is external to the first device; and means for storing the remaining descriptors in the set of free buffer descriptors in the buffer cache located in a memory that is internal to the first device.

20. The apparatus of claim 19, wherein the external memory is located in the second device.

21. The apparatus of claim 19, further comprising:

means for transferring descriptors in the set of free buffer descriptors between the internal and external memories in a manner that is transparent to the second device.

22. The apparatus of claim 21, further comprising:

means for transferring, in response to the number of free buffer descriptors in the buffer cache being greater than a maximum trigger threshold value, free buffer descriptors from the internal memory to the external memory until the number of descriptors in the buffer cache is less than or equal to a maximum target threshold value.

23. The apparatus of claim 21, further comprising:

means for transferring, in response to the number of free buffer descriptors in the buffer cache being less than a minimum trigger threshold value, free buffer descriptors from the external memory to the internal memory until the number of descriptors in the buffer cache is greater than or equal to a minimum target threshold value.

24. A computer-readable media including instructions for execution by a processor, the instructions for a method of efficiently managing a set of data buffers accessible to first and second devices interconnected by a bus, the method comprising:

storing a set of free buffer descriptors in a buffer cache accessible to the first device, each free buffer descriptor referencing a respective data buffer available to store data;

determining whether the number of descriptors in the set of free buffer descriptors is greater than a predetermined threshold value; and transferring, in response to the number of descriptors being greater than the predetermined threshold value, free buffer descriptors from the first device to the second device until the number of descriptors in the set of free buffer descriptors is less than the predetermined threshold value.

\* \* \* \* \*